(12) United States Patent
Takahashi et al.

(10) Patent No.: US 11,115,484 B2
(45) Date of Patent: Sep. 7, 2021

(54) CONTROL APPARATUS AND CONTROL METHOD

(71) Applicant: FUJITSU LIMITED, Kawasaki (JP)

(72) Inventors: Eiichi Takahashi, Kawasaki (JP); Akira Shiba, Kawasaki (JP); Kazuki Matsui, Kawasaki (JP)

(73) Assignee: FUJITSU LIMITED, Kawasaki (JP)

( * ) Notice: Subject to any disclaimer, the term of this patent is extended or adjusted under 35 U.S.C. 154(b) by 272 days.

(21) Appl. No.: 16/362,582

(22) Filed: Mar. 22, 2019

(65) Prior Publication Data

US 2019/0297150 A1 Sep. 26, 2019

(30) Foreign Application Priority Data

Mar. 26, 2018 (JP) .............................. JP2018-058720

(51) Int. Cl.
*H04L 29/08* (2006.01)

(52) U.S. Cl.
CPC .............. *H04L 67/16* (2013.01); *H04L 67/10* (2013.01)

(58) Field of Classification Search
None
See application file for complete search history.

(56) References Cited

U.S. PATENT DOCUMENTS

| 9,037,698 | B1 * | 5/2015 | Nordstrom | ............ G06F 11/301 709/224 |
| 9,076,021 | B2 * | 7/2015 | Pittelko | ............... G06F 21/6218 |
| 2018/0248772 | A1 * | 8/2018 | Orsini | ...................... H04L 67/10 |
| 2018/0307514 | A1 * | 10/2018 | Koutyrine | ............. G06F 11/0706 |
| 2019/0182309 | A1 * | 6/2019 | Koszek | .................. H04L 69/329 |

FOREIGN PATENT DOCUMENTS

| EP | 0445954 | 9/1991 | |
| EP | 0445954 A2 * | 9/1991 | ............ G06F 9/546 |
| JP | 6-28199 | 2/1994 | |
| JP | 7-271620 | 10/1995 | |

* cited by examiner

*Primary Examiner* — Mohamed Ibrahim
(74) *Attorney, Agent, or Firm* — Fujitsu Patent Center

(57) ABSTRACT

A control apparatus includes one or more memories; and one or more processors configured to in response to reception of a first message, by referring to a reception history of one or more messages received prior to the received first message, determine whether a second message having a second timestamp newer than a first timestamp of the received first message has been received, when the second message has been received, perform a first process on the first message and a second process on the second message in order indicated by the first timestamp and the second timestamp, and transmit, to an apparatus to which the first message is transmitted next, a first correction notification including an instruction to correct order of processes executed by the apparatus with respect to the first message and the second message.

19 Claims, 18 Drawing Sheets

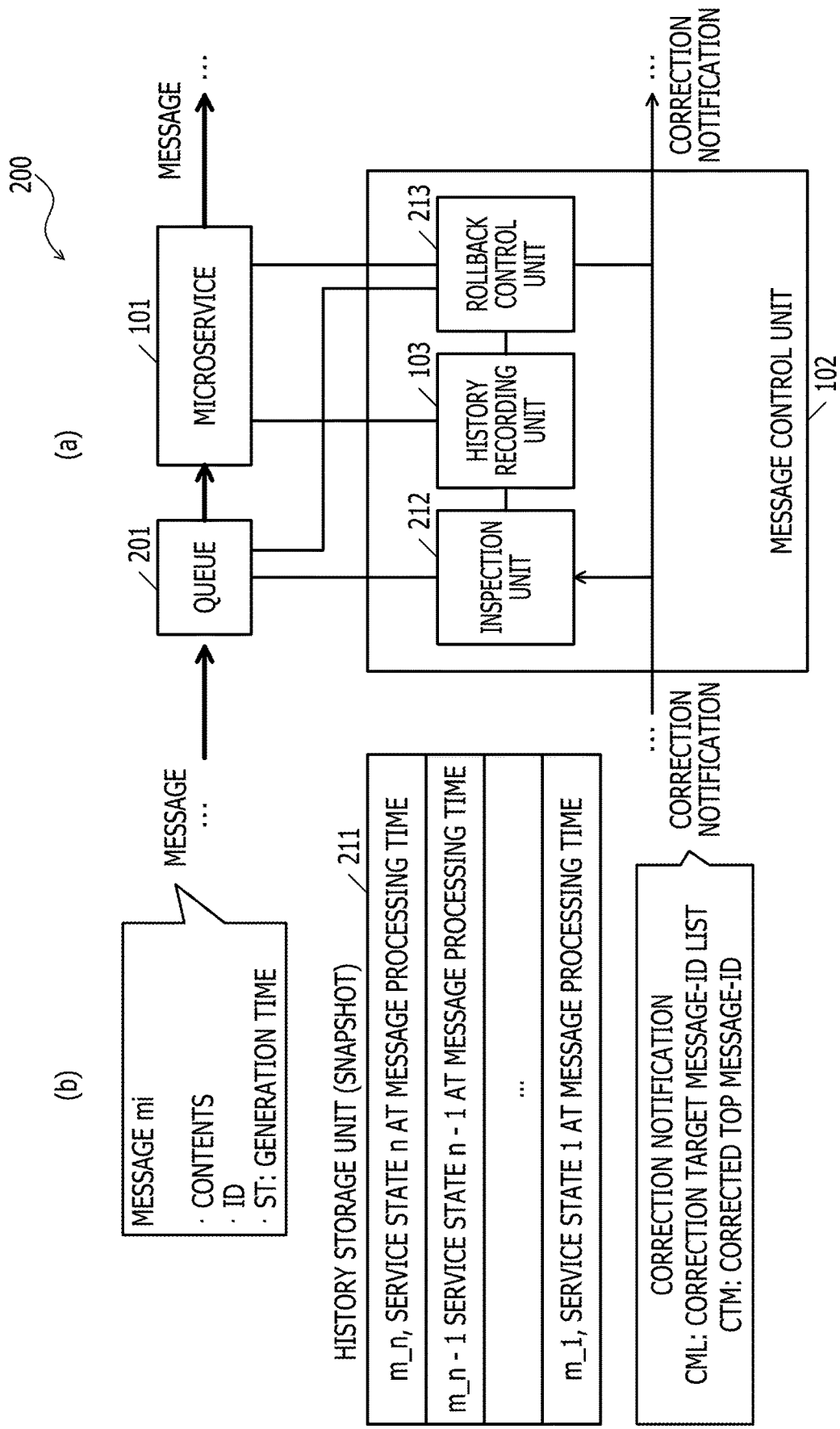

FIG. 12
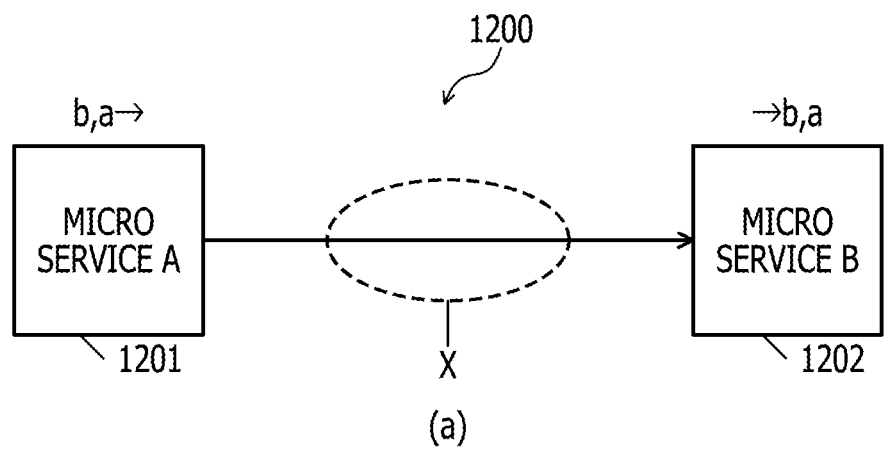
(a)
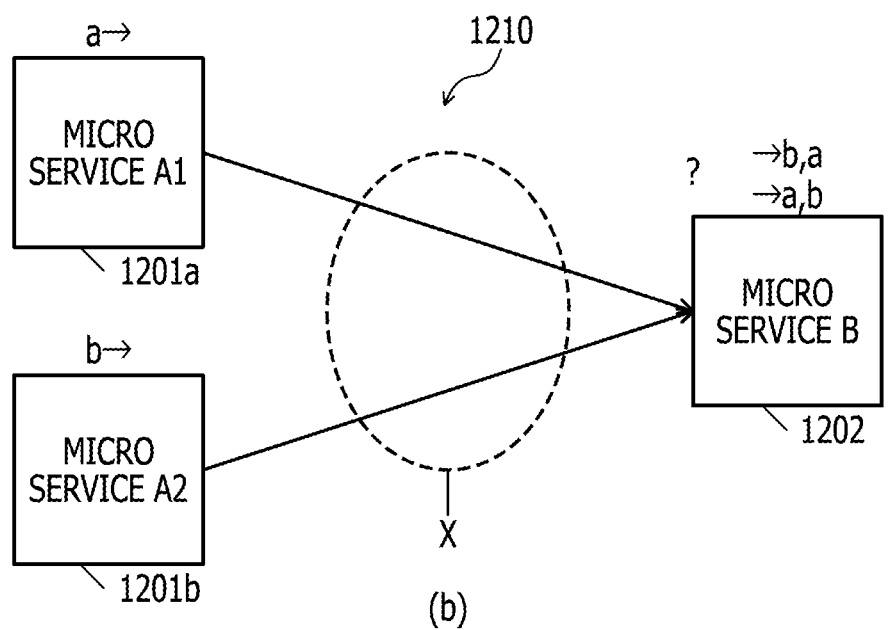
(b)

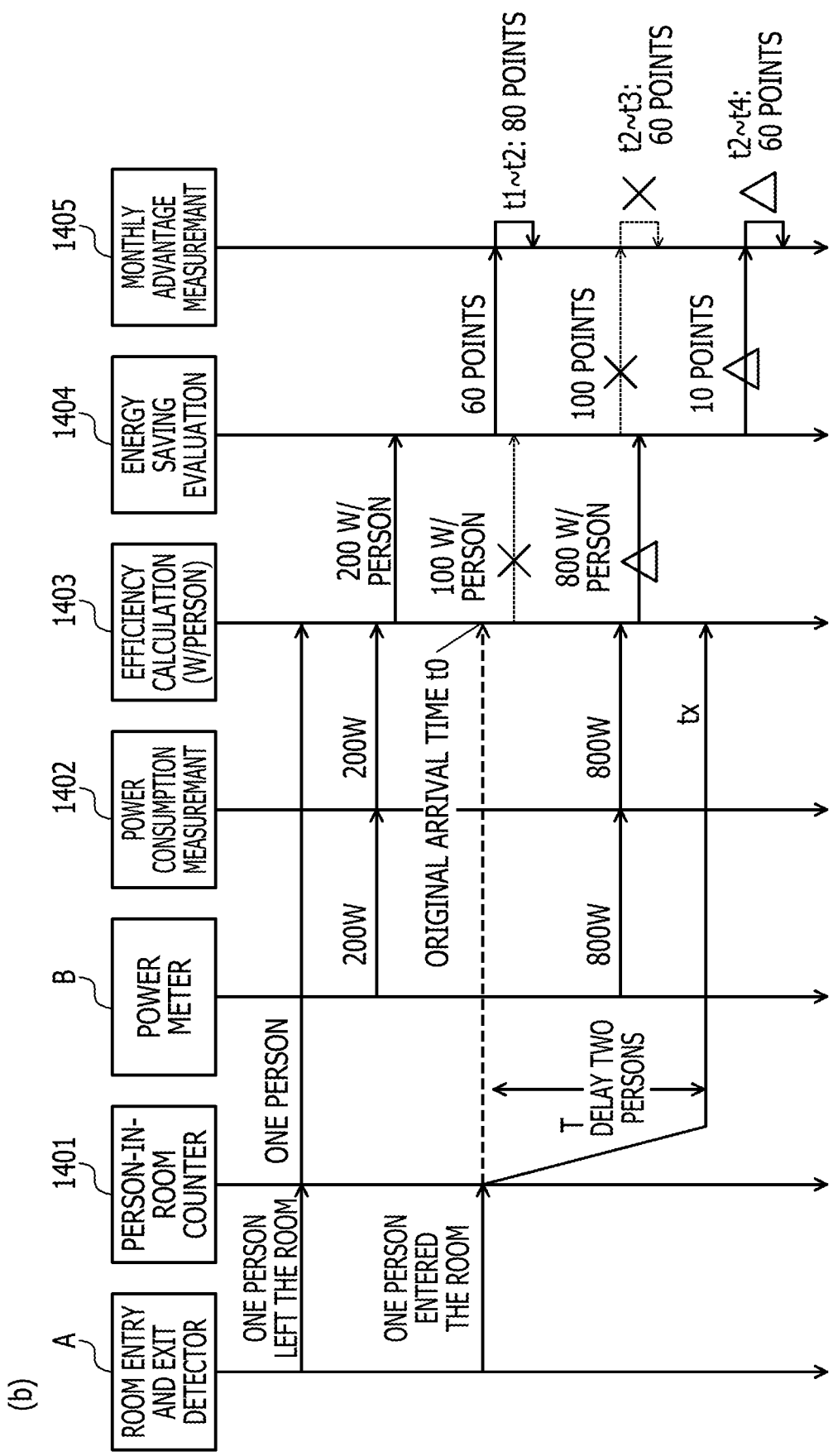

CONTROL APPARATUS AND CONTROL METHOD

CROSS-REFERENCE TO RELATED APPLICATION

This application is based upon and claims the benefit of priority of the prior Japanese Patent Application No. 2018-58720, filed on Mar. 26, 2018, the entire contents of which are incorporated herein by reference.

FIELD

The embodiments discussed herein are related to microservice control techniques.

BACKGROUND

In a distributed processing system implemented mainly in the cloud, a distributed system called a microservice architecture is constructed, and the microservice is processed in a distributed manner. Most microservices are small microservices having a simple function, such as search, authentication, or the like, and a plurality of microservices are combined to build a bigger microservice. For example, an online sales microservice is constructed by combining five microservices, namely, a web interface microservice, an authentication microservice, a search microservice, a shopping cart microservice, and a database microservice.

As a method of combining microservices, messaging is widely used. Messaging enables microservices to connect with each other by exchanging messages. Messaging is suitable for asynchronous execution in which a message transmission side (upstream) microservice performs the next message processing without waiting for the reception of a previous message by a reception side (downstream) microservice.

An upstream microservice transmits successive messages in sequence regardless of whether or not a downstream microservice performs message processing, and the downstream microservice stores the messages in a buffer called a queue. The downstream microservice repeatedly extracts messages from the queue and performs message processing.

In the related art, there is disclosed a technique of synchronizing parallel processing in which rollback is performed using timestamps so as to match the contents of messages to be transmitted from first processing to second processing. There is also disclosed a technique in which each application program collects a transmission and reception log, provides a timestamp indicating a partial order relationship, and searches for the latest checkpoint to which the application programs are allowed to be rolled back to recover the application programs.

For example, related-art techniques are disclosed in Japanese Laid-open Patent Publication No. 6-028199 and Japanese Laid-open Patent Publication No. 7-271620.

SUMMARY

According to an aspect of the embodiments, a control apparatus includes one or more memories; and one or more processors configured to in response to reception of a first message, by referring to a reception history of one or more messages received prior to the received first message, determine whether a second message having a second timestamp newer than a first timestamp of the received first message has been received, when the second message has been received, perform a first process on the first message and a second process on the second message in order indicated by the first timestamp and the second timestamp, and transmit, to an apparatus to which the first message is transmitted next, a first correction notification including an instruction to correct order of processes executed by the apparatus with respect to the first message and the second message.

The object and advantages of the invention will be realized and attained by means of the elements and combinations particularly pointed out in the claims.

It is to be understood that both the foregoing general description and the following detailed description are exemplary and explanatory and are not restrictive of the invention.

BRIEF DESCRIPTION OF DRAWINGS

FIG. 2A is an explanatory diagram illustrating an example of the functional configuration of an information processing apparatus according to the embodiment;

FIG. 12 is explanatory diagram illustrating examples of message communication according to the related art;

FIGS. 15A and 15B are explanatory diagrams illustrating a problem that occurs when a plurality of microservices work together according to the related art.

DESCRIPTION OF EMBODIMENTS

However, in the related art, it has not been possible to compensate for a disrupted order of messages in message communication performed among microservices.

In messaging, for various reasons, messages sometimes arrive in an order different from that at the time of transmission. For example, when a message is transmitted via a slow network path different from that of a subsequent message and is lost on the network, the message is re-transmitted after transmission of a subsequent message. Alternatively, when a message is large, and the message is divided into partial messages and transmitted, a small subsequent message sometimes arrives at the downstream side ahead of the other divided partial messages.

When the arrival order of a message is different from the transmission order, it is sometimes not possible for a microservice to perform correctly. For example, if the arrival order of a message changes, there arises a problem that a microservice that handles data (messages) from a sensor or a terminal may perform incorrect processing. For example, for a microservice that handles an event that occurs in the real world as a message, a message corresponding to the event has to be processed in the transmission order at the time of the occurrence of the event. However, message arrival may be delayed due to various causes. If a transmission order is assured on a transmission path, an expensive system having a dedicated network has to be constructed.

In the related-art rollback technique, it is not possible to determine the extent (the number of generations) to which the microservice state (snapshot) is to be saved, and thus an operator determines a certain number of generations based on subjective experience. In this case, a sufficient number of generations of snapshots have to be saved on the downstream side, and thus an excessive number of snapshots are saved. Accordingly, there arises a problem centered substantially on the high cost of storage resources (hardware).

In microservices having a 1:1 connection between the transmission side (upstream side) and the reception side (downstream side), a method of compensating for a disrupted arrival order of messages is provided by an order assurance mechanism, such as message queuing (MQ), or the like. However, in a system in which a part of the microservices has an n:1 connection, it is not possible to compensate for a disrupted arrival order of messages on the downstream side.

Following, detailed descriptions will be given of a disclosed information processing apparatus and an information processing system according to the embodiments with reference to the drawings. The information processing apparatus is an example of a microservice control apparatus.

Figure 1:
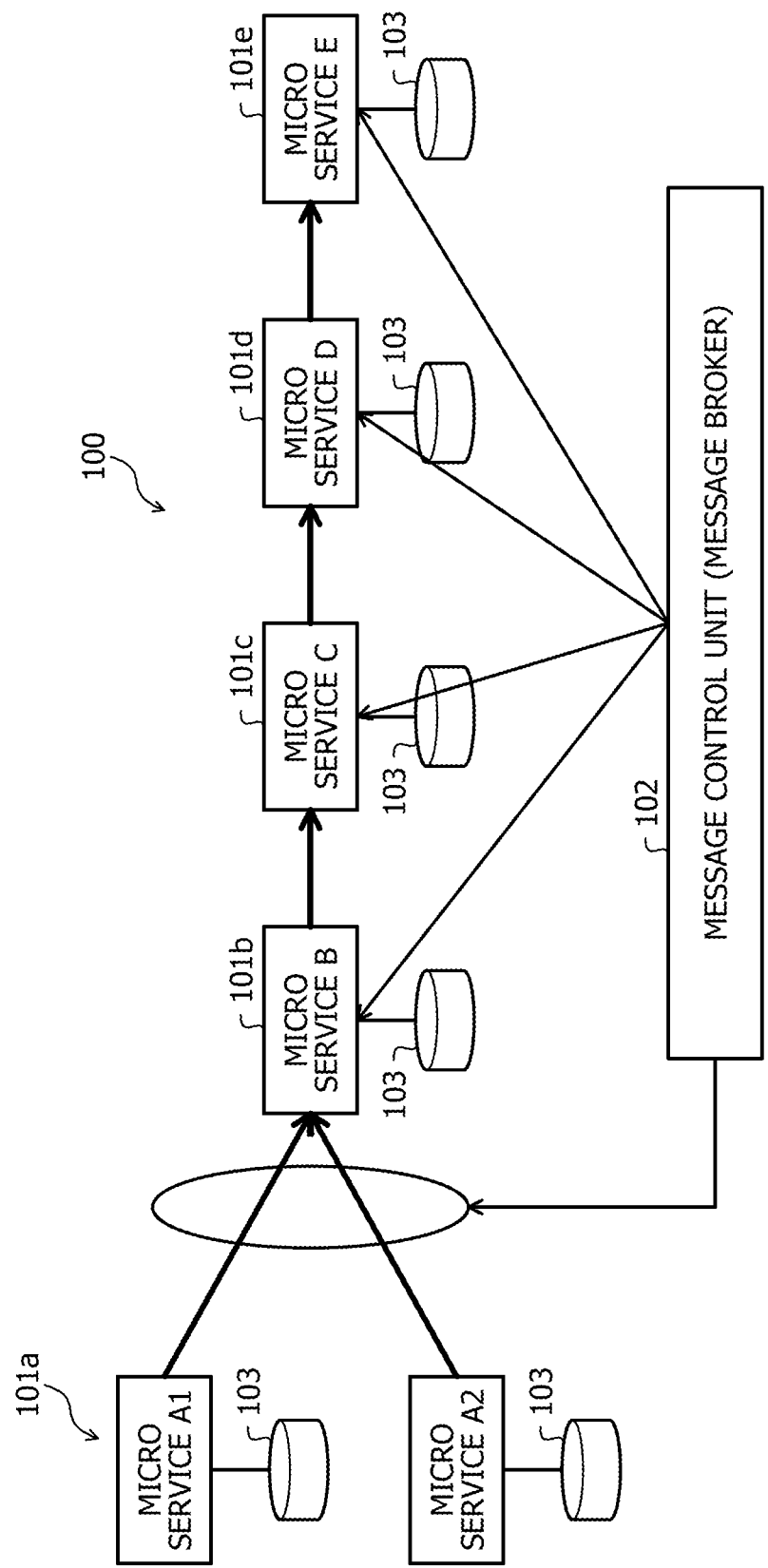
FIG. 1 is an explanatory diagram illustrating an example of the overall configuration of a system according to an embodiment.

FIG. 1 is an explanatory diagram illustrating an example of the overall configuration of a system according to the embodiment. A description will be given of an overview of the arrival order assurance of messages that is performed by the information processing system according to the embodiment with reference to FIG. 1.

In an information processing system 100 according to the embodiment, microservice processing units 101 (101a to 101e) for respective microservices A to E perform in a distributed manner different message processing (data processing) on respective messages (data) of a received requested microservice.

A requested microservice refers to a request for a predetermined microservice made by an external client of the information processing system 100, for example, by a terminal operation performed by a user, or a data processing request based on the detection data of a sensor device, or the like.

At this time, as illustrated by an arrow (→) in FIG. 1, a plurality of microservice processing units 101 perform message processing on the respective messages input from upstream microservice processing units 101 and then transmit the messages to the respective downstream microservice processing units 101.

It is possible for each of the microservice processing units 101 to transmit and receive messages to and from, for example, a plurality of servers in the cloud by using a network connection. In the following description, "upstream" and "downstream" denote a message flow direction. A microservice processing unit 101 on a transmission side, which is located upstream, transmits a result of service processing as a message, and a microservice processing unit 101 on a reception side, which is located downstream, receives the message.

In the example in FIG. 1, the information processing system 100 includes microservice processing units 101a that perform the individual microservices A1 and A2 in parallel. In such a configuration, the microservice processing unit 101a of the microservices A1 and A2 transmits messages without assuring order.

In the embodiment, a message control unit 102 is disposed, and the message control unit 102 performs arrival order control (rollback control) so as to correct the arrival order of messages in the plurality of microservice processing units 101 (101a to 101e). The message control unit 102 may be disposed independently from the microservice processing units 101 as illustrated in FIG. 1. In this case, it is possible for the message control unit 102 to be disposed independently from the service processing units 101 as a separate apparatus, for example, a message broker (a message control apparatus). As described later, the message control unit 102 may be disposed in the same apparatus (for example, a server) with each of the microservice processing units 101.

A message having a timestamp indicating a first occurrence time is input to the information processing system 100 described above. Each of the microservice processing units 101 that has received a message from the upstream side records and keeps as a record a snapshot of the service state of the microservice for each message processing operation in a history recording unit 103. A snapshot includes a timestamp corresponding to the end time of the microservice processing operation.

The message control unit 102 references the timestamp of a message input into a queue 201 (refer to FIGS. 2A and 2B) and determines an arrival delay of the message by comparing the timestamps (generation time) of the messages in the queue 201.

The message control unit 102 compares the timestamp of a message received by each of the microservice processing units 101 with the timestamp of the most recent state snapshot and determines whether or not there is an arrival delay of the message in each of the microservice processing units 101.

The message control unit 102 controls one of the microservice processing units 101 having an arrival delay of a message and all the downstream microservice processing units 101 so as to roll back to the previous message processing state of the delayed message. Accordingly, the microservice processing unit 101 having an arrival delay of a message and all the downstream microservice processing units 101 re-perform the microservices in the correct arrival order of the message. Accordingly, even if an arrival delay of a message occurs for a request message in the information processing system 100, it becomes possible for all the message control units 102 to perform message processing to assure the processing order.

FIG. 2A is an explanatory diagram illustrating an example of the functional configuration of the information processing apparatus according to the embodiment. One of the microservice processing units 101 of the microservices illustrated in FIG. 1 is disposed in an information processing apparatus 200 that performs one of the microservices (data processing) out of the requested microservice.

(a) of FIG. 2A is a functional block diagram illustrating an example of the configuration in which a message control unit 102 is disposed for each information processing apparatus 200 (microservice processing unit 101). (b) of FIG. 2A is a diagram illustrating an example of information held in the information processing apparatus 200 (message, data, or the like).

As illustrated in (a) of FIG. 2A, the information processing apparatus 200 includes the microservice processing unit 101 described above, the message control unit 102, and the queue 201. The message control unit 102 includes the history recording unit 103, an inspection unit 212, and a rollback control unit 213.

The queue 201 keeps messages (data) received from the upstream side in arrival order and outputs the messages to the microservice processing units 101. A message mi includes the contents (data), the identifier (ID) of the message, and the generation time (timestamp: ST) (refer to (b) of FIG. 2A).

Each of the microservice processing units 101 performs message processing (data processing) based on a predetermined microservice function on the message (data) output from the queue 201 and transmits the processed message to the downstream information processing apparatus 200.

The history recording unit 103 sequentially records and keeps the processing message for each message processing operation performed by the microservice processing unit 101 and a snapshot. For example, the history recording unit 103 stores snapshots sequentially from bottom to top in order of message processing as illustrated in (b) of FIG. 2A. A snapshot includes a timestamp corresponding to the end time of the microservice processing performed by the microservice processing unit 101.

The inspection unit 212 detects whether or not there is an arrival delay of the messages received by the queue 201. The inspection unit 212 references a timestamp at the time of the message processing performed by the history recording unit 103 and detects whether or not there is an arrival delay of the messages based on whether the timestamp (generation time ST) of the message in the queue 201 is new or old.

The inspection unit 212 transmits information indicating the incorrect arrival order of a message among the received messages, for example, information denoting an arrival delay, to the downstream information processing apparatus 200 as a correction notification.

The correction notification includes a correction target message-ID list (CML) and a corrected top message-ID (CTM) (refer to (b) of FIG. 2A). A correction target message-ID list (CML) is a set of listed IDs of the messages that are affected by the order change. A corrected top message ID (CTM) is an ID of the first message having the corrected arrival order. The correction notification is generated and transmitted by the message control unit 102 (inspection unit 212) that has detected an arrival delay of a message and is transmitted from the upstream information processing apparatus 200 to the downstream information processing apparatus 200 in the same manner as for the message described above.

When the message control units 102 are integrated independently from the microservice processing units 101 as illustrated in FIG. 1, the integrated message control unit 102 broadcasts correction notifications to a plurality of the corresponding downstream microservice processing units 101 (each server, or the like).

When the inspection unit 212 receives a correction notification from an upstream information processing apparatus 200, if a message being processed remains in the queue 201, the inspection unit 212 performs control so as to delete messages remaining in the queue 201 (data deletion, or the like). The inspection unit 212 sorts the messages in the queue 201 in accordance with the message deletion.

When the rollback control unit 213 receives a correction notification from an upstream information processing apparatus 200, the rollback control unit 213 cancels message processing for the microservice processing units 101 and performs rollback control so as to return to the state before the message processing of the correction target. In the rollback control, the rollback control unit 213 performs returning processing of a message having a message arrival delay to the queue 201 out of the snapshots recorded and stored by the history recording unit 103 in response to reception of the correction notification.

Figure 2B:
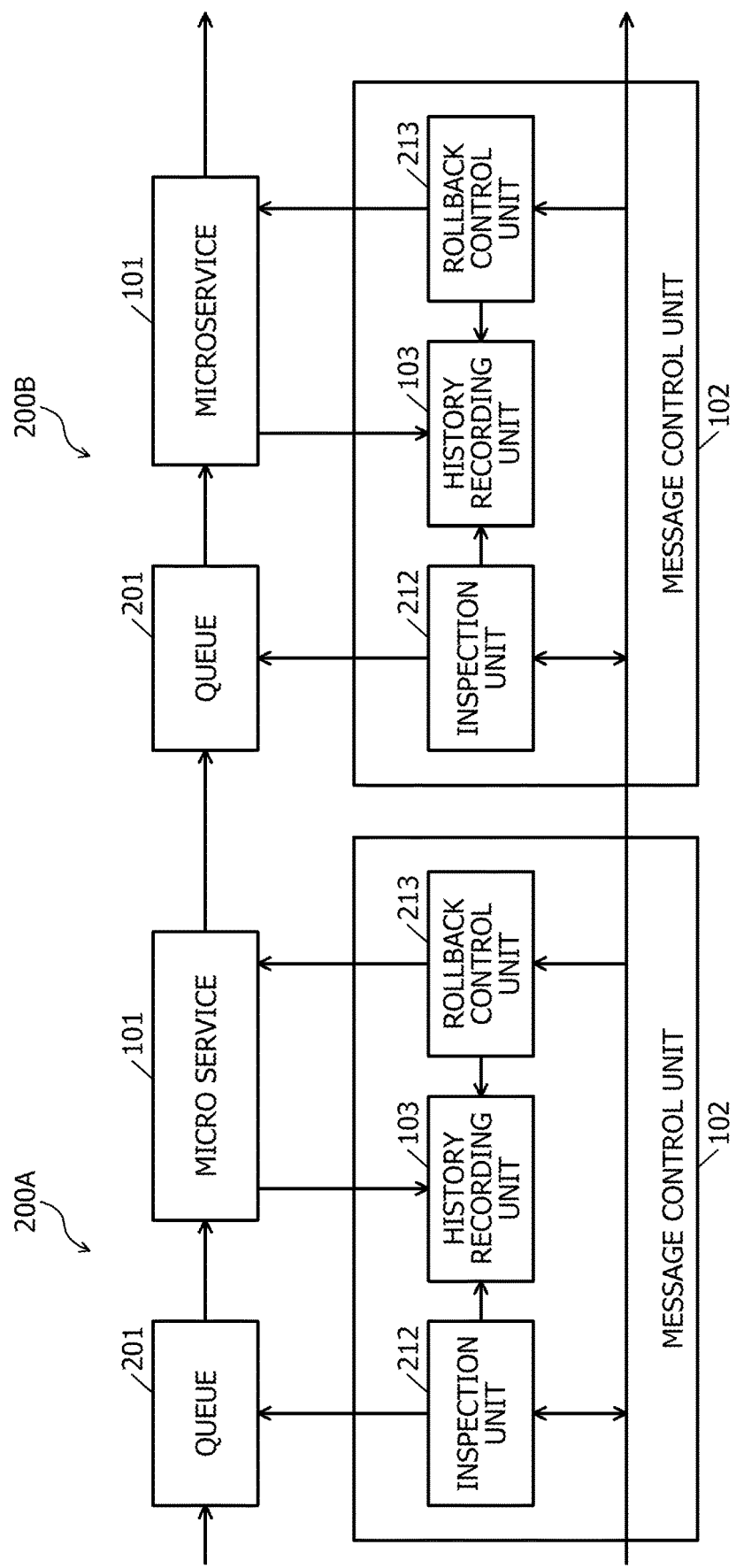
FIG. 2B is an explanatory diagram illustrating an example of the connection configuration between the information processing apparatuses according to the embodiment.

FIG. 2B is an explanatory diagram illustrating an example of the connection configuration between the information processing apparatuses according to the embodiment. FIG. 2B illustrates a plurality of information processing apparatuses 200A and 200B having a connection among a plurality of microservices. The internal configuration of each of the information processing apparatuses 200A and 200B is the same as that illustrated in (a) of FIG. 2A. As illustrated in FIG. 2B, a message and a correction notification are propagated from the upstream information processing apparatus 200A to the downstream information processing apparatus 200B.

Figure 3:
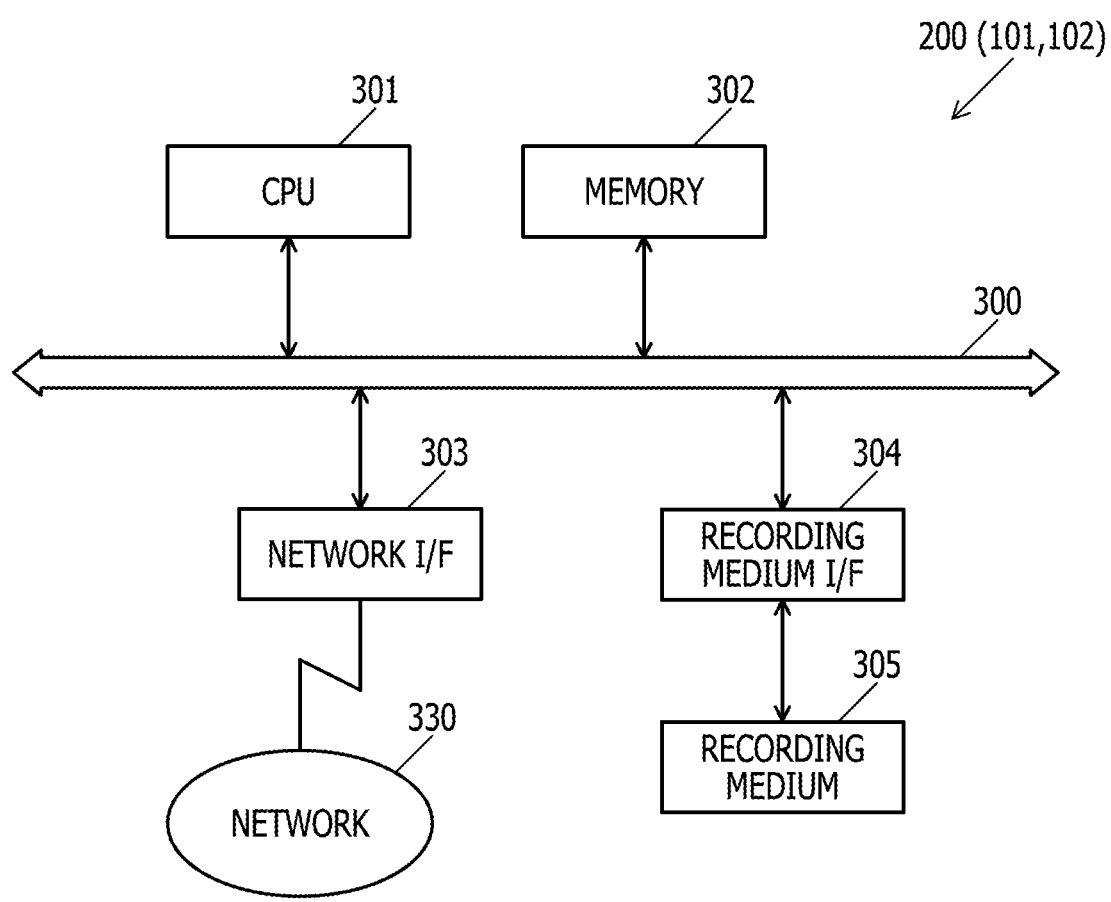
FIG. 3 is a block diagram illustrating an example of the hardware configuration of the information processing apparatus according to the embodiment.

FIG. 3 is a block diagram illustrating an example of the hardware configuration of the information processing apparatus according to the embodiment. It is possible for the information processing apparatus 200 illustrated in FIG. 2A to use the hardware illustrated in FIG. 3.

For example, the information processing apparatus 200 includes a central processing unit (CPU) 301, a memory 302, a network interface (I/F) 303, a recording medium I/F 304, and a recording medium 305. Reference 300 denotes a bus that connects each unit.

The CPU 301 is an arithmetic processing unit that functions as a control unit that performs overall control of the information processing apparatus 200. The memory 302 includes a nonvolatile memory and a volatile memory. The nonvolatile memory is, for example, a read-only memory (ROM) that stores programs to be executed by the CPU 301. The volatile memory is, for example, a dynamic random access memory (DRAM), a static random access memory (SRAM), or the like to be used by the CPU 301 as a working area.

The network I/F 303 transmits and receives information (the above-described message, correction notification, or the like) demanded for processing to and from the other information processing apparatus 200 via a network 330. The network I/F 303 enables communication with the other information processing apparatus 200 via the network 330, such as a local area network (LAN), a wide area network (WAN), the Internet, or the like.

The recording medium I/F 304 is an interface for reading and writing the information processed by the CPU 301 from and to the recording medium 305. The recording medium 305 is a recording device that complements the memory 302. The recording medium 305 may be, for example, a hard disk drive (HDD), a solid state drive (SSD), a Universal Serial Bus (USB) flash drive, or the like.

The CPU 301 executes the programs stored in the memory 302 or on the recording medium 305 so as to realize the functions of the microservice processing unit 101 and the message control unit 102 (the inspection unit 212 and the rollback control unit 213) of the information processing apparatus 200 illustrated in FIG. 2A. It is possible to store the queue 201 illustrated in FIG. 2A and the information of the history recording unit 103 by using the memory 302 and the recording medium 305.

In the case of the system configuration illustrated in FIG. 1, it is possible to individually apply the hardware configuration illustrated in FIG. 3 to a predetermined server having a function of the microservice processing unit 101 that performs processing of each microservice and a server having a function of the message control unit 102 in the same manner. In each of the servers, when the CPU 301 executes a program, the CPU 301 reads the program from the memory 302 or the recording medium 305 and executes the program so as to realize the functions of the individual servers.

Figure 4:
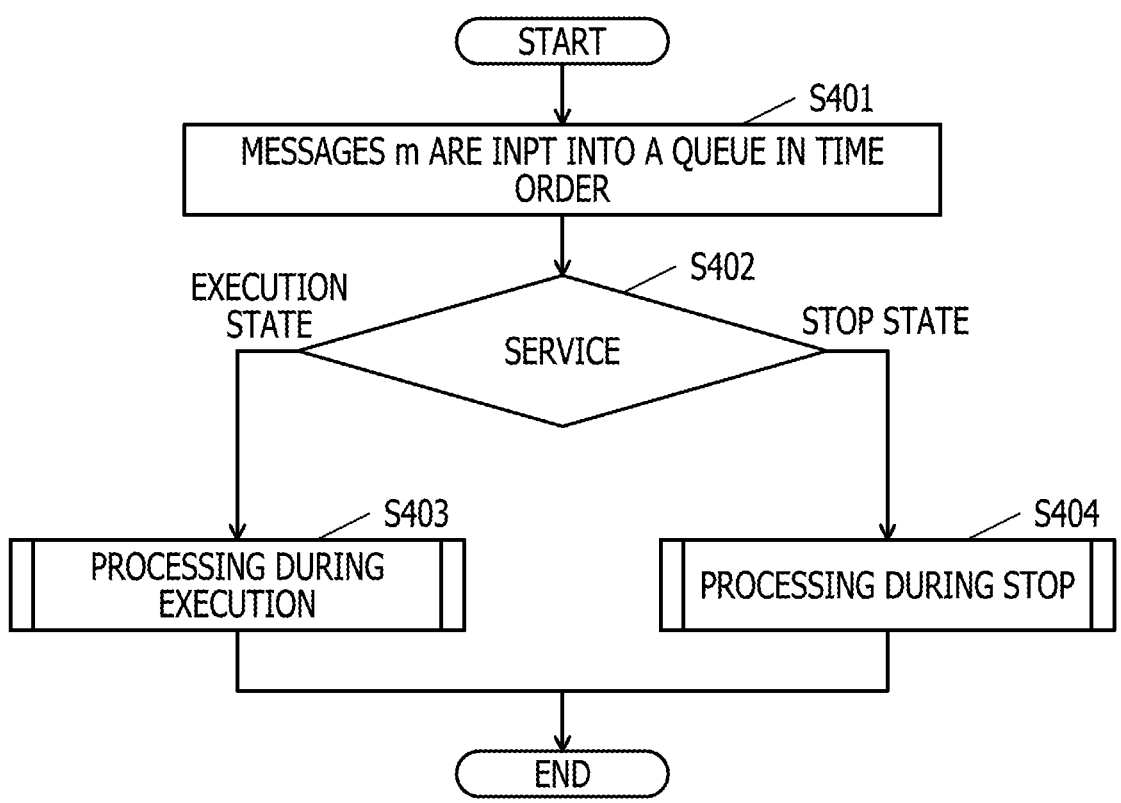
FIG. 4 is a flowchart illustrating an example of the procedure of the entire processing performed by the information processing apparatus according to the embodiment.

FIG. 4 is a flowchart illustrating an example of the procedure of the entire processing performed by the information processing apparatus according to the embodiment. The processing illustrated in FIG. 4 is performed mainly by the message control unit 102 disposed in one of the information processing apparatuses 200.

In the information processing apparatus 200, a received message m is input to the queue 201 (step S401). The queue 201 stores messages m in order of timestamp.

The message control unit 102 determines whether the microservice of the microservice processing unit 101 is in an execution state or in a stopped state (step S402). If the microservice is in the execution state (step S402: execution state), the message control unit 102 performs processing during execution corresponding to the running state of the microservice (step S403). On the other hand, if the microservice is the stopped state (step S402: stopped state), the message control unit 102 performs processing during stoppage corresponding to the stopped state of the microservice (step S404). After the processing of step S403 or step S404 is executed, the microservice processing unit 101 terminates the above processing.

A description will be given of the execution state and the stopped state of the microservice later. Normally, the microservice processing unit 101 continues the microservice (message processing) so that the microservice is in the execution state (corresponding to the processing time of the problem cases 1 to 3 described later). On the other hand, when the microservice processing unit 101 stops the microservice based on the correction notification received from the upstream side, the microservice enters a stopped state (corresponding to the processing time of the problem case 4).

Figure 5:
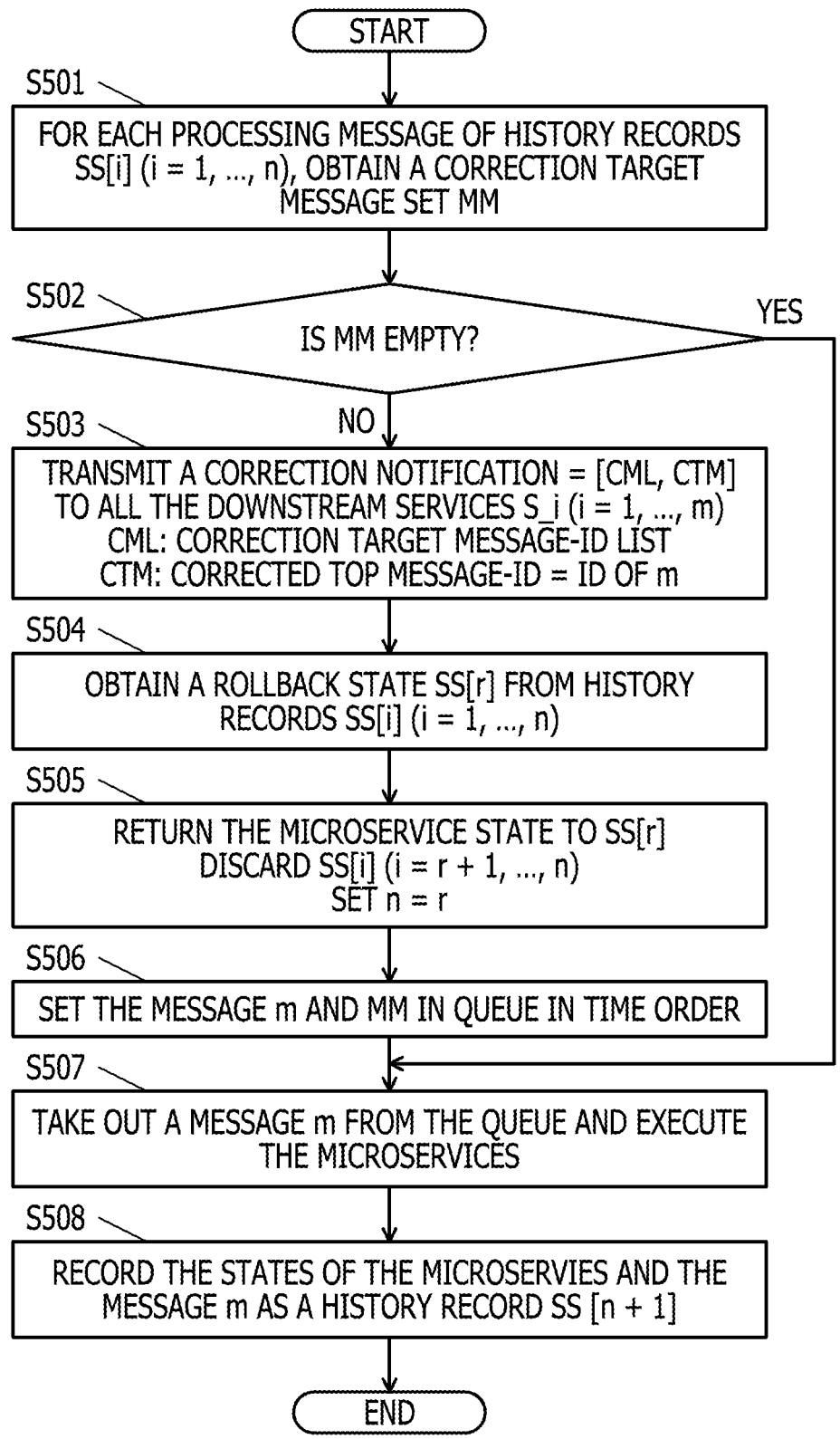
FIG. 5 is a flowchart illustrating an example of the procedure of the processing during execution of the information processing apparatus according to the embodiment.

FIG. 5 is a flowchart illustrating an example of the procedure of the processing during execution of the information processing apparatus according to the embodiment. The processing in FIG. 5 is the detailed processing of step S403 in FIG. 4 and is performed by the message control unit 102 disposed in the information processing apparatus 200 that is provided upstream and has detected a message arrival delay.

First, the inspection unit 212 of the message control unit 102 checks the snapshots (history records) SS[i] (i=1, . . . , n) recorded and stored in the history recording unit 103. The inspection unit 212 obtains a set of messages MM having a timestamp more recent than the top message m in the queue 201 among the messages having being subjected to the message processing by the microservice processing unit 101 (step S501). The MM is a message set to be corrected and having a delay, or the like.

The inspection unit 212 determines whether or not MM is empty (step S502). If MM is empty (step S502: Yes), the processing proceeds to step S507.

On the other hand, if MM is not empty (step S502: No), the inspection unit 212 determines that the message m has arrived late. The inspection unit 212 transmits a correction notification (CML and CTM) to the message control unit 102 (rollback control unit 213) of each of the information processing apparatuses 200 corresponding to all the downstream microservices (step S503).

The correction target message-ID list CML is a set of message IDs of the elements of MM described above and a corrected top message-ID (CTM) is an ID of the message m.

Next, the rollback control unit 213 of the message control unit 102 obtains a rollback state SS[r] from the snapshot SS[i] (i=1, . . . , n) recorded and held in the history recording unit 103 (step S504). Reference mj is a message having a timestamp more recent than the timestamp of the message m and the earliest timestamp in the snapshot SS. Next, the rollback control unit 213 obtains a snapshot SS[r+1] corresponding to the time when the microservice processing unit 101 performed the message processing on the mj and then obtains the rollback state of the snapshot SS[r], which immediately precedes SS[r+1].

Next, the rollback control unit 213 returns the microservice state of the microservice processing unit 101 to SS[r] and discards the snapshots SS[r+1] to the SS[n] among the snapshots recorded and stored by the history recording unit 103. A variable n is set: n=r (step S505).

Next, the rollback control unit 213 sets the message m and each message in MM in the queue 201 in time order (timestamp order) (step S506). The microservice processing unit 101 then extracts the message m from the queue 201 and performs the microservice (step S507). After this, the history recording unit 103 additionally records the state of the microservice at that point and the message m as a snapshot SS[n+1] (step S508), and the processing is terminated. A description will be later given of the recording capacity (maximum size) for recording snapshots by the history record unit 103.

Figure 6:
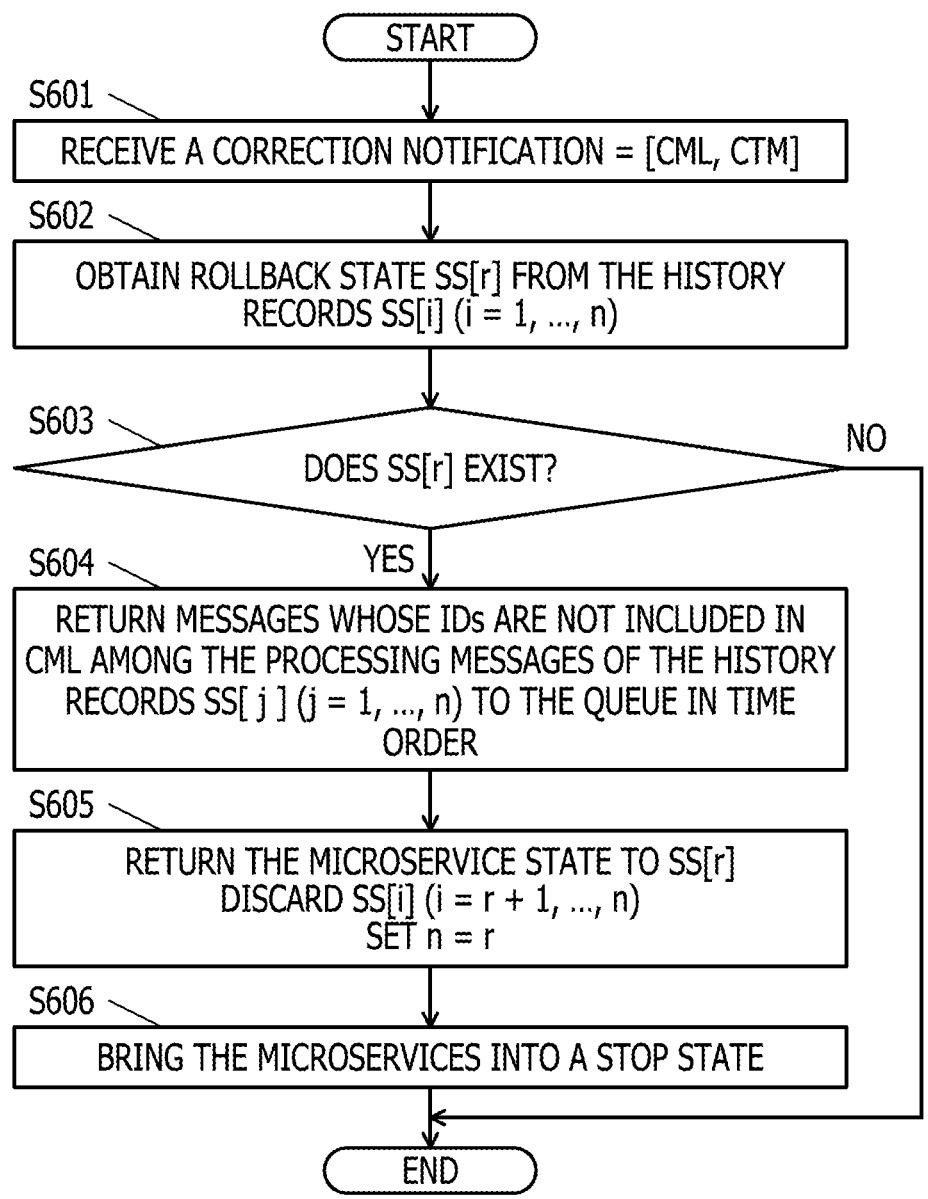
FIG. 6 is a flowchart illustrating an example of the procedure of processing during execution of the information processing apparatus according to the embodiment.

FIG. 6 is a flowchart illustrating an example of the procedure of the processing during execution of the information processing apparatus according to the embodiment. The processing in FIG. 6 is the detailed processing of step S403 in FIG. 4 and is performed by the message control unit 102 (rollback control unit 213) disposed in the information processing apparatus 200 that is provided at the downstream and has received a correction notification.

The rollback control unit 213 receives a correction notification from the message control unit 102 of the upstream information processing apparatus 200 (step S601). At the time of receiving the correction notification, the rollback control unit 213 obtains a rollback state SS[r] from the snapshot SS[i] (i=1, . . . , n) recorded and held by the history record unit 103 (step S602). SS[r] is a snapshot SS[r] immediately before the snapshot SS[r+1] having the oldest timestamp of the processed message among the snapshots in the CML of the correction notification including messages ID of the messages having been subjected to the message processing by the microservice processing unit 101.

Next, the rollback control unit 213 determines whether SS[r] exists or not in the history recording unit 103 (step S603). If SS[r] does not exist in the history recording unit 103 (step S603: No), the subsequent processing is not performed and the processing is terminated. This is the state in which only the message processing older than the message having a message arrival delay has been performed, and thus rollback does not have to be performed.

On the other hand, if the rollback control unit 213 finds that SS[r] exists in the history recording unit 103 (step S603: Yes), this is the state in which the microservice processing unit 101 has performed the message processing on the subsequent message in advance of the message having the message arrival delay. In this case, the rollback control unit 213 returns the messages having not its ID in the CML of the correction notification to the queue 201 in time order (timestamp order) among the processing messages of the snapshot SS[j] (j=1, . . . , n) in the history recording unit 103 (step S604).

The rollback control unit 213 returns the microservice state to SS[r]. The rollback control unit 213 discards the snapshots SS[r+1] to SS[n], which are subsequent to SS[r], recorded and held in the history recording unit 103. It is assumed that n=r (step S605).

After this, the rollback control unit 213 brings the microservice into a stop state (step S606) and terminates the above processing. After this, the message control unit 102 of the information processing apparatus 200 having the microservice in a stop state performs the processing during stop illustrated in FIG. 4 (step S404).

As described above, the microservice performed by the microservice processing unit 101 has two states, namely, an execution state and a stop state. In the execution state, a message is extracted from the queue 201 and executed by the processing in step S507 illustrated in FIG. 5. On the other hand, when the rollback control unit 213 receives a correction notification, the microservice goes into the stop state in step S606 in FIG. 6. During the stop state period, the operation of the microservice (message processing) of the microservice processing unit 101 is stopped and a message is not obtained from the queue 201.

Figure 7:
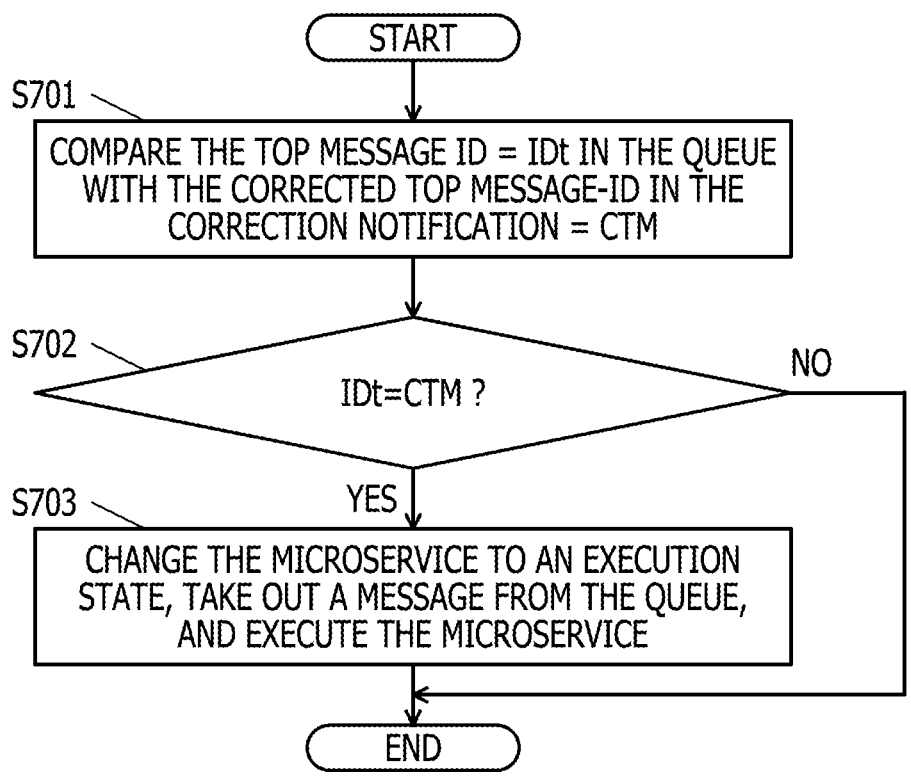
FIG. 7 is a flowchart illustrating an example of the procedure of processing during stop of the information processing apparatus according to the embodiment.

FIG. 7 is a flowchart illustrating an example of the procedure of processing during stop of the information processing apparatus according to the embodiment. The processing in FIG. 7 is the detailed processing of step S404 in FIG. 4 and is performed by the message control unit 102 disposed in the information processing apparatus 200 that is provided at the downstream and has received a correction notification.

When the message control unit 102 receives a message when the microservice is being stopped, the message control unit 102 performs the processing during stop of step S404 illustrated in FIG. 4. In the processing during stop, first, the inspection unit 212 of the message control unit 102 compares the top message ID (IDt) of the queue 201 with the corrected top message ID (CTM) of the correction notification (step S701).

After this, the inspection unit 212 determines whether or not the top message ID (IDt) and the corrected top message ID (CTM) of the correction notification are the same (step S702). As a determination result, if IDt differs from CTM (step S702: No), the inspection unit 212 determines that a message to be executed again has not arrived, and the processing is terminated without performing the subsequent processing.

On the other hand, as a determination result, if the IDt and the CTM are the same (step S702: Yes), the message is a message to be executed again. Accordingly, the message control unit 102 (inspection unit 212) changes the microservice to the execution state and causes the microservice processing unit 101 to extract a message from the queue 201 and to perform the microservice (step S703).

Figure 8:
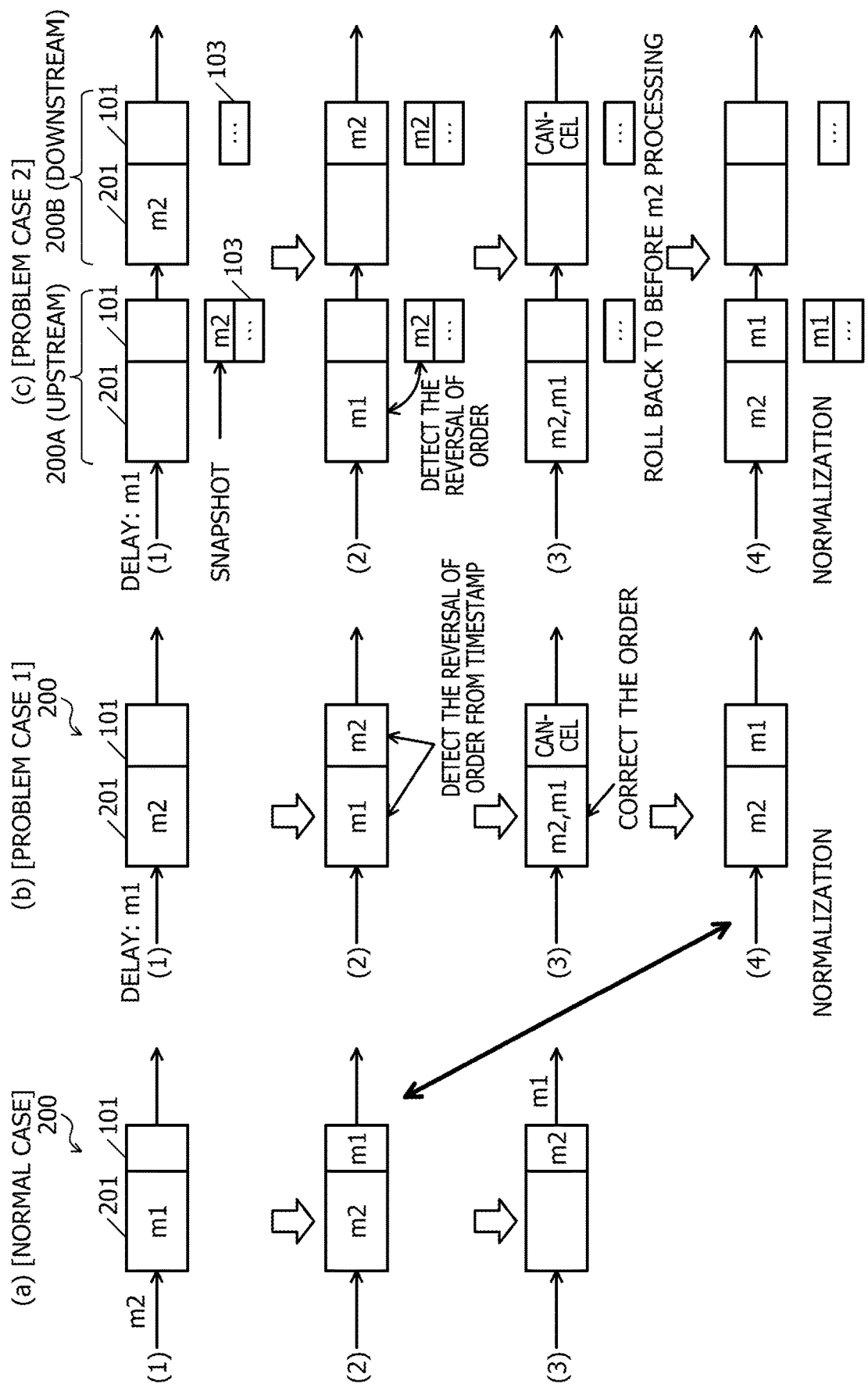
FIG. 8 is an explanatory diagram illustrating an example of message processing of the information processing apparatus according to the embodiment.
Figure 9:
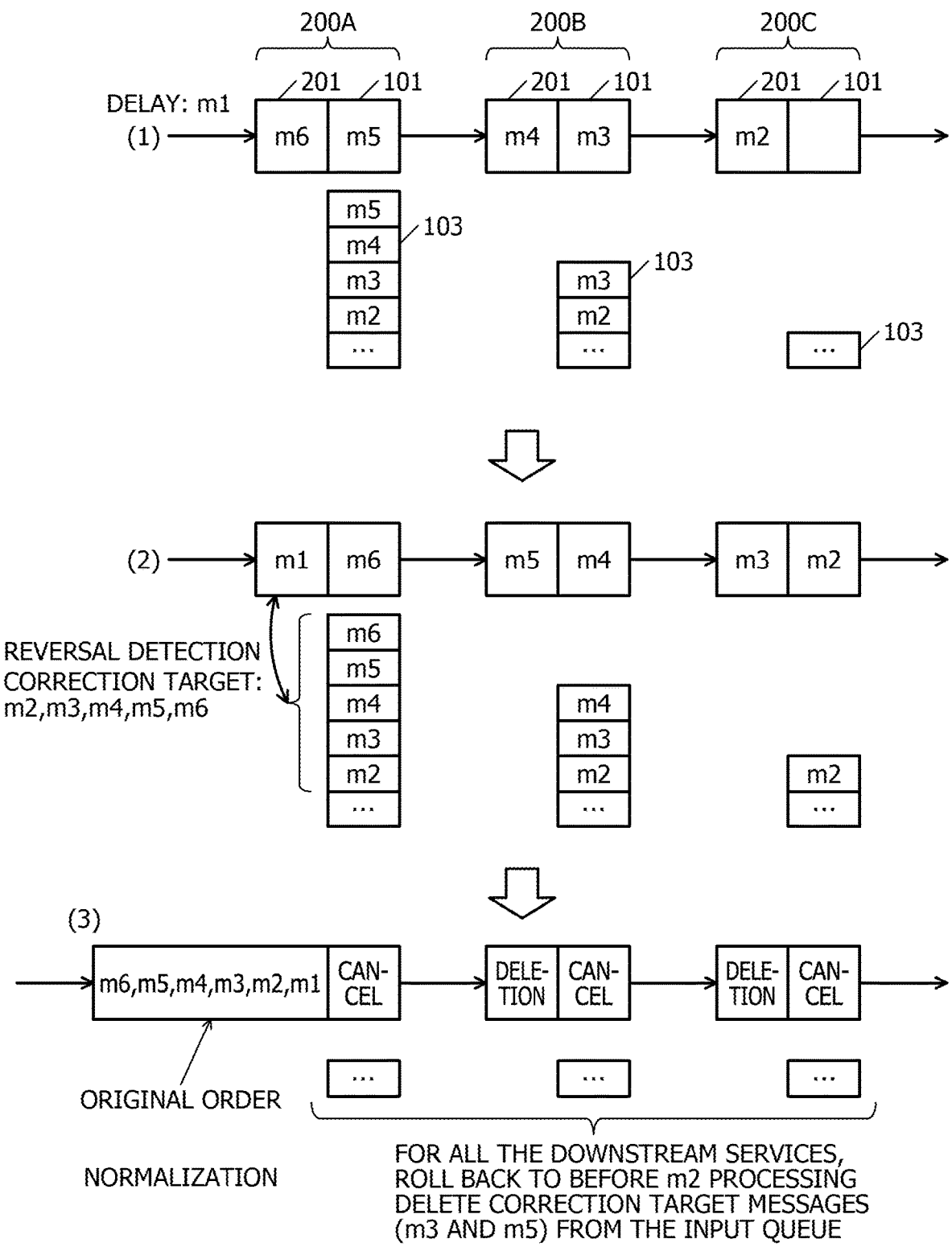
FIG. 9 is an explanatory diagram illustrating an example of message processing of the information processing apparatus according to the embodiment.
Figure 10:
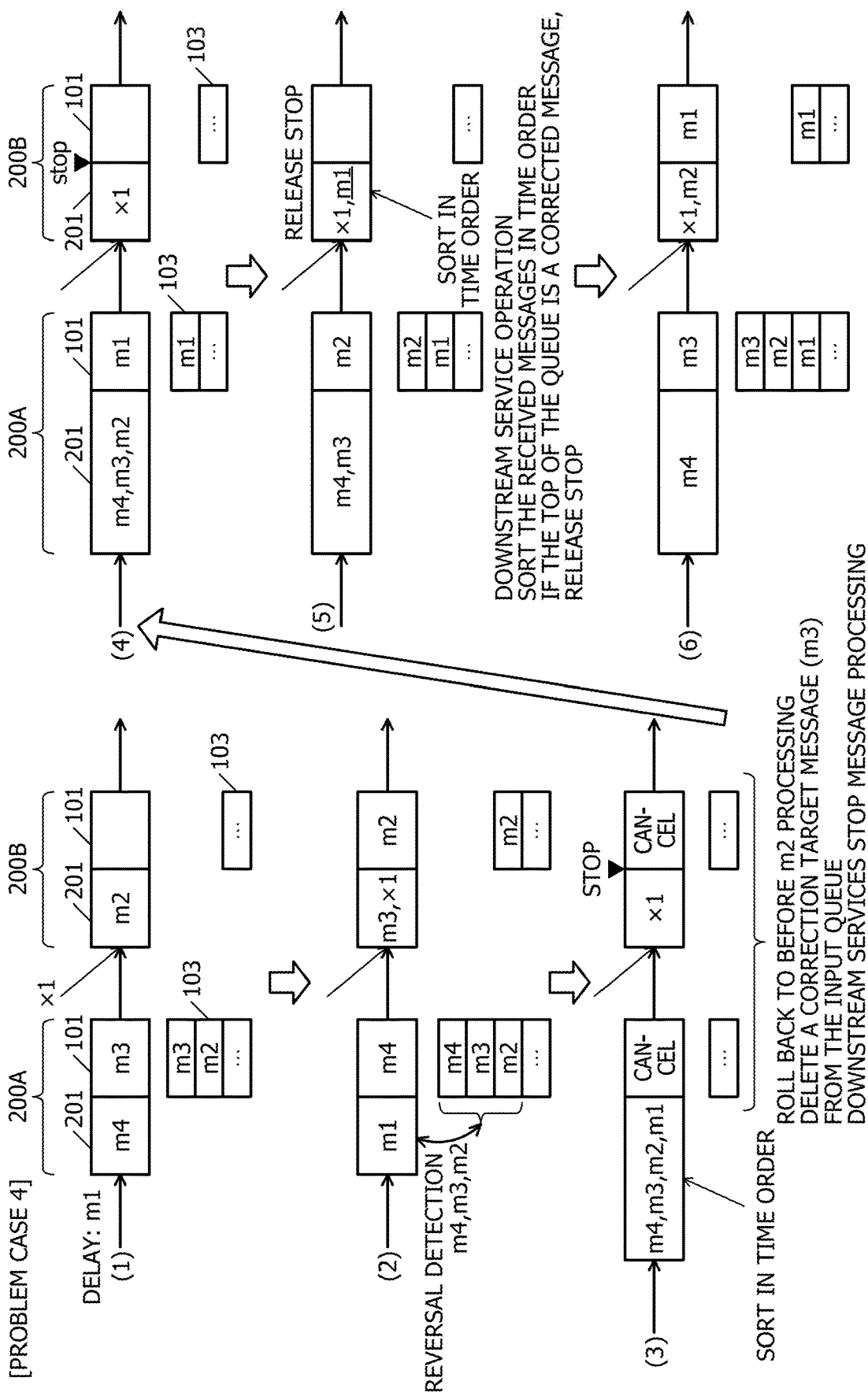
FIG. 10 is an explanatory diagram illustrating an example of message processing of the information processing apparatus according to the embodiment.

FIG. 8 to FIG. 10 are explanatory diagrams illustrating examples of message processing of the information processing apparatus according to the embodiment. A description will be given of an overview of the correction processing corresponding to each problem case having a different arrival order of a message in the information processing apparatus 200 with reference to the diagrams. In FIG. 8 to FIG. 10, a pair of one queue 201 and a microservice processing unit 101 is illustrated for each of the information processing apparatuses 200 that execute a predetermined microservice.

(a) of FIG. 8 illustrates an example of the processing when the arrival order of messages is normal, (b) of FIG. 8 illustrates an example 1 of the correction processing for the problem case 1, and (c) of FIG. 8 illustrates an example 2 of the correction processing for the problem case 2.

(a) of FIG. 8: In the case where the arrival order of messages is normal, (1) when messages m1 and m2 are received in this order, first, a message m1 is input into the queue 201. After this, (2) the microservice processing unit 101 performs message processing on the message m1, and at this time, a message m2 is input into the queue 201. After this, (3) the microservice processing unit 101 transmits the message m1 having been subjected to the message processing and performs message processing on the message m2. At this time, the queue 201 becomes empty.

(b) of FIG. 8: The problem case 1 illustrates the state in which an arrival delay of a message order has occurred in only one information processing apparatus 200. Originally, as illustrated in (a) of FIG. 8, the messages m1 and m2 are received in this order. However, it is assumed that a delay of the message m1 has occurred. (1) When the messages m2 and m1 are received in this order, the message m2 is input into the queue 201 in advance. After this, (2) the microservice processing unit 101 performs message processing on the message m2, and the message m1 is input into the queue 201.

As described above, the messages m1 and m2 have timestamps (generation time). In the embodiment, the information processing apparatus 200 (the message control unit 102) determines an arrival delay (reversal of the order) of the message m1 by the timestamps. The message control unit 102 performs rollback so that the messages are corrected to the normal arrival order, namely, m1 and m2.

Thereby, (3) the messages m1 and m2 are input into the queue 201 in this order, and the microservice processing unit 101 cancels the message processing on the message m2. After this, (4) it is possible to perform message processing in the normal message arrival order, namely, m1 and m2. As in the problem case 1, it is possible to perform correction processing on the impact of a message arrival delay in one information processing apparatus 200 by only a comparison using the timestamps.

(c) of FIG. 8: The problem case 2 illustrates the queue 201 and the microservice processing unit 101 of each of the upstream information processing apparatus 200A and the downstream information processing apparatus 200B and illustrates the case in which a delay of the message m1 influences as far as the downstream information processing apparatus 200B.

First, (1) it is assumed that the messages m2 and m1 are arranged in this order, the message m2 has been subjected to the message processing in the upstream information processing apparatus 200A and is input into the queue 201 of the downstream information processing apparatus 200B, and the message m1 has not been received by the upstream information processing apparatus 200A.

After this, (2) it is assumed that the message m1 is input into the queue 201 of the upstream information processing apparatus 200A, and the microservice processing unit 101 of the downstream information processing apparatus 200B performed the message processing on the message m2.

In the embodiment, the microservice processing unit 101 of the upstream information processing apparatus 200A records and keeps a snapshot m2 at the time of message processing. The message control unit 102 of the information processing apparatus 200A determines an arrival delay (reversal of the order) of the message m1 by comparing the timestamp of the message m1 in the queue 201 with the snapshot m2. In the information processing apparatuses 200A and 200B, the message control unit 102 performs rollback to before the m2 processing so as to correct the messages to the normal arrival order, namely, m1 and m2.

At this time, the information processing apparatus 200A that has determined that the message arrival order is not normal, the information processing apparatus 200A transmits the correction notification described above to the downstream information processing apparatus 200B.

Thereby, (3) the messages m1 and m2 are input in this order into the queue 201 of the upstream information processing apparatus 200A. The microservice processing unit 101 of the downstream information processing apparatus 200B cancels the message processing on the message m2. After this, (4) It is possible for the upstream information processing apparatus 200A to perform the message processing in the arrival order of normal messages, namely, m1 and m2. It is also possible for the downstream information processing apparatus 200B to receive the messages m1 and m2 in this order from the upstream information processing apparatus 200A and to normally perform the message processing.

FIG. 9 illustrates an example 3 of the correction processing for a problem case 3. The problem case 3 illustrates the case in which although the arrival order at normal time is the messages m1 and m2, m3, m4, m5, and m6, the message m1 has been and delayed, and thus the arrival order has been changed to the order of m2, m3, m4, m5, m6, and m1.

First, it is assumed that (1) among the messages m2, m3, m4, m5, m6, and m1, the message m2 has been input into the queue 201 of the lowermost information processing apparatus 200C. It is assumed that the message m3 has been message processed by the microservice processing unit 101 of the intermediate information processing apparatus 200B, and the message m4 has been input into the queue 201 of the information processing apparatus 200B. It is assumed that the message m5 has been message processed by the microservice processing unit 101 of the uppermost stream information processing apparatus 200A, and the message m6 has been input into the queue 201 of the information processing apparatus 200A. The message m1 is assumed not to have been processed in the information processing apparatus 200A.

In this case, in the embodiment, the uppermost stream information processing apparatus 200A has recorded and keeps the snapshots of the messages m2, m3, m4, and m5. The intermediate information processing apparatus 200B has recorded and keeps the snapshots of the messages m2 and m3.

(2) The message control unit 102 of the information processing apparatus 200A compares the timestamp of the message m1 with the snapshots m2 to m6 in the queue 201. By the comparison, the message control unit 102 determines that an arrival delay (reversal of the order) of the message m1 has occurred, and that the order of the messages m2 to m6 are to be corrected. The message control unit 102 of the information processing apparatus 200A performs rollback to before the m2 processing so as to correct the messages to have the normal arrival order: m1 and m2, m3, m4, m5, and m6.

Thereby, (3) in the uppermost stream information processing apparatus 200A, the messages m1 and m2, m3, m4, m5, and m6 are input into the queue 201 in this order, and the microservice processing unit 101 cancels the message processing of the message m6. In the intermediate information processing apparatus 200B, the correction target message m5 in the queue 201 is deleted, and the microservice processing unit 101 cancels the message processing of the message m4. In the lowermost stream information processing apparatus 200C, the correction target message m3 in the queue 201 is deleted, and the microservice processing unit 101 cancels the message processing of the message m2.

At this time, the information processing apparatus 200A that has determined that the arrival order the messages is not normal transmits the correction notification described above to all the downstream information processing apparatuses 200B and 200C.

Thereby, it is possible for the upstream information processing apparatus 200A to perform message processing in the normal message arrival order: m1, m2, m3, m4, m5, and m6. It is also possible for the intermediate and the downstream information processing apparatuses 200B and 200C to receive messages m1 and m2 in this order from the upstream information processing apparatus 200A and to normally perform message processing.

After this, for example, if the case occurs that the intermediate information processing apparatus 200B fails to receive messages in a normal arrival order, the intermediate information processing apparatus 200B and the downstream information processing apparatus 200C perform the same correction processing as described above. In this manner, even if a message delay occurs on any one of the transmission paths of a plurality of information processing apparatuses 200, it becomes possible for each of the information processing apparatuses 200 to correct the arrival order of the messages and to become possible to normally perform the message processing. As illustrated in FIG. 9, even if a plurality of microservices are connected, the number of stages of the information processing apparatus 200 has increased, and the number of messages to be influenced has increased, it is possible to correct the arrival order of the messages to normal order by the same correction processing.

FIG. 10 illustrates an example 4 of the correction processing for a problem case 4. The problem case 4 illustrates, as an example of a connection between the microservices, namely, the transmission side 2: the reception side 1, an example of the system configuration in which a plurality of microservices (two microservices) are disposed at the upstream side, and messages join together into one downstream microservice (one microservice).

In FIG. 10, out of the two microservices on the upstream side, one information processing apparatus 200A transmits messages m1 to m4, and the other information processing apparatus (not illustrated in the figure) transmits a message x1. An example of the configuration is illustrated in which the messages m1 to m4, and x1 join together and received in the downstream information processing apparatus 200B.

It is assumed that the arrival order of the messages at normal time is m1, m2, x1, m3, and m4.

(1) A state is illustrated in which the message m1 has been delayed, and thus the message arrival order has been changed to m2, x1, m3, m4, and m1. At this time, it is assumed that the message m2 is input into the queue 201 of the downstream information processing apparatus 200B. The upstream information processing apparatus 200A has recorded and keeps the snapshots of the messages m2 and m3, and the message m4 is in the queue 201.

Next, (2) in the downstream information processing apparatus 200B, the microservice processing unit 101 performs the message processing on the message m2, and records and keeps the snapshot of the message m2. In the upstream information processing apparatus 200A, the microservice processing unit 101 performs the message processing on the message m4, and records and keeps the snapshots of the messages m2 to m4. The message m1 is input into the queue 201.

In the embodiment, the message control unit 102 of the information processing apparatus 200A determines whether or not the message m1 has an arrival delay (reversal of the order) by comparing the timestamp of the message m1 in the queue 201 with the snapshots m2 to m4. The message control unit 102 also determines that the messages m2 to m4 are to be corrected in the order. The message control unit 102 of the information processing apparatus 200A performs rollback to before the m2 processing so as to correct the messages to have the normal arrival order: m1, m2, m3, and m4.

Thereby, (3) in the upstream information processing apparatus 200A, the messages m1, m2, m3, and m4 are input into the queue 201 in this order, and the microservice processing unit 101 cancels the message processing of the message m4 and deletes the snapshots m2 to m4.

In the downstream information processing apparatus 200B, the correction target message m3 in the queue 201 is deleted, and the queue 201 includes only the message x1. At this time, the microservice processing unit 101 cancels the message processing of the message m2 and stops the message processing.

At this time, the information processing apparatus 200A that has determined that the arrival order of the messages is not normal transmits the correction notification described above to the downstream information processing apparatus 200B.

Next, (4) in the upstream information processing apparatus 200A, the microservice processing unit 101 performs the message processing on the message m1 and records and keeps the snapshot m1. In the downstream information processing apparatus 200B, the microservice processing unit 101 keeps stopping the message processing.

After this, (5) in the upstream information processing apparatus 200A, the microservice processing unit 101 performs the message processing on the message m2, and records and keeps the snapshots m1 and m2. The queue 201 keeps the messages m3 and m4. In the downstream information processing apparatus 200B, the message control unit 102 sorts the received messages in time order, and messages m1 and x1 are input into the queue 201. At this time, if the top of the queue 201 is the corrected message (m1), the message control unit 102 releases the stop of the microservice processing unit 101.

After this, (6) in the upstream information processing apparatus 200, it is possible to perform the message processing in the normalized message arrival order: m1, m2, m3, and m4. It is also possible for the downstream information processing apparatus 200B to normally perform message processing on the messages that are joined in the order of the messages m1, m2, x1, m3, and m4.

In the embodiment, the maximum recording capacity (size $N_{max}$) for keeping the snapshots is set by the following expression (1) based on the above-described problem cases 1 to 4.

$$N_{max} = 1 + \sum_{i=1}^{m}(Q_i + 1) \qquad (1)$$

Note that m is the number of downstream microservices (the number of microservice processing units 101) and $Q_i$ is the queue size of the i-th microservice in the downstream.

Figure 11:
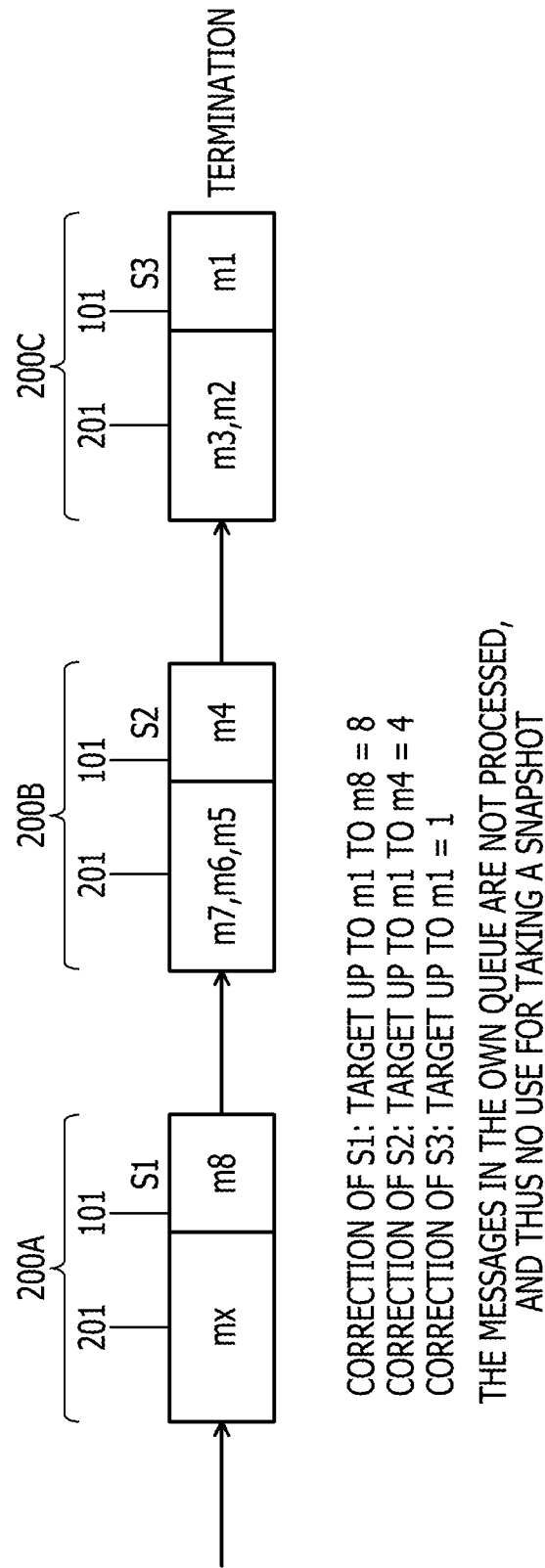
FIG. 11 is an explanatory diagram illustrating the size of a snapshot demanded for the information processing apparatus according to the embodiment.

FIG. 11 is an explanatory diagram illustrating the size of a snapshot demanded for the information processing apparatus according to the embodiment. A description will be given of an example of the case in which there are three microservice processing units 101 (information processing apparatuses 200A to 200C), and the message arrival order is m1 to m8, and mx (message mx is a state before the microservice processing).

In this case, in order for the microservice processing unit S1 (101) of the uppermost stream information processing apparatus 200A to perform correction, the messages m1 to m8 are to be corrected at the maximum (the number of snapshots=8). In order for the microservice processing unit S2 (101) of the intermediate information processing apparatus 200B to perform correction, the messages m1 to m4 are to be corrected at the maximum (the number of snapshots=4). In order for the microservice processing unit S3 (101) of the lowermost stream information processing apparatus 200C to perform correction, the message m1 is to be corrected at the maximum (the number of snapshots=1).

In this manner, with the embodiment, the lower the downstream microservice (microservice processing unit 101), the fewer the number of snapshots have to be taken. That is to say, in the embodiment, all the microservices from the upstream to the downstream do not have to record the same number of snapshots (the number of recordings demanded for the uppermost stream microservice), and thus it is possible to reduce the size of the storage resources (history recording units 103) in the entire system.

It is possible to recover from incorrect microservice execution due to a message arrival delay and to execute a correct microservice, and thereby to keep the number of recording snapshots demanded for the history recording unit 103 to the minimum.

Until the message control unit 102 detects a first arrival delay of a message, the message control unit 102 does not have to take a snapshot. After the message control unit 102 detects a first message arrival delay, the message control unit 102 may take a snapshot including the downstream microservices. In this case, it is assumed that the message control unit 102 does not perform recovery (correction processing) of the incorrect microservice processing of the first message due to the arrival delay.

Until the message control unit 102 (the inspection unit 212) detects a first message arrival delay, the message control unit 102 keeps timestamp t_a of the message processed finally by microservice processing unit 101. The message control unit 102 may compare with timestamp t_b of the message that has arrived, and if t_b is older than t_a, the message control unit 102 may determine as an arrival delay.

In this case, the recovery after the detection of a message arrival delay starts from the second message arrival delay. However, the message control unit 102 does not have to take the snapshots by all the microservice processing units 101, and thus it is possible to reduce the size of the storage resources (history recording units 103) for taking snapshots.

The history recording unit 103 may record only the initial state snapshot SS[0] of the microservice and the processed messages. The snapshot SS[i] (i=1, . . . , n) becomes only the records of the messages. In this case, the rollback processing by the rollback control unit 213 is to return the microservice state to SS[0], and to execute the messages up to the obtained SS[r] in sequence. Thereby, it becomes possible to reduce the size of the snapshots, and to reduce the size of the storage resources (history recording units 103) for taking snapshots.

About the Related Art

FIG. 12 is explanatory diagrams illustrating examples of the message communication according to the related art. (a) of FIG. 12 is an example of the configuration of a system 1200 when the ratio of the microservice 1201 and the microservice 1202 is 1:1, and (b) of FIG. 12 is an example of the configuration of a system 1200 when the ratio of the microservice 1201 and the microservice 1202 is n:1.

In a one-to-one system 1200 illustrated in (a) of FIG. 12, it is assumed that after a microservice A (1201) transmitted messages a and b in this order, a delay X of a message a occurs due to communication congestion on the path, or the like. In this case, for example, it is possible for the microservice B (1202) to receive the messages in the normal message order: a and b by the related-art order assurance mechanism, such as MQ, or the like.

However, with the related art, it is not possible to assure the message order in an n-to-1 system 1210 illustrated in (b) of FIG. 12. It is assumed that two microservices A1 (1201*a*) and A2 (1201*b*) are disposed at the upstream, the microservice A1 (1201*a*) transmits a message a, and the microservice A2 (1201*b*) transmits a message b. The downstream microservice B (1202) jointly receives the messages a and b from the two upstream microservices A1 and A2 (1201*a* and 1201*b*) respectively.

It is not possible for the system 1210 including such a joining on a path to assure the message order. In the case of (b) of FIG. 12, the downstream side receive messages in the arrival order of either the messages a and b, or the messages b and a. However, it is not possible to determine which order is correct even if an order assurance mechanism is used.

If a message arrival order is changed due to communication congestion, or the like, an incorrect processing result is propagated downstream as a message, and all the downstream processing produce incorrect results. With the related art, it becomes possible to determine a message arrival delay only after an old message arrived, and thus an arrival delay is inevitably detected after incorrectly processed message was transmitted. Accordingly, it is not possible to stop processing before transmitting a message to the downstream.

For example, in the system 1210, if the microservice B (1202) receives the messages a and b in this order, it is possible for the microservice B to perform correct message processing in this arrival order: a and b. However, if a delay of the message a occurs, and the microservice B (1202) receives the messages b and a in this order, the microservice B performs message processing in the arrival order: b and a, and transmits the messages to the downstream. After the microservice B (1202) got the messages a and b, the microservice B detects an arrival delay of the message a by comparing the timestamp, or the like. However, the arrival delay is detected after the incorrect processing result was transmitted. Incorrect processing result is propagated to all the downstream microservices of the system 1210.

Figure 13:
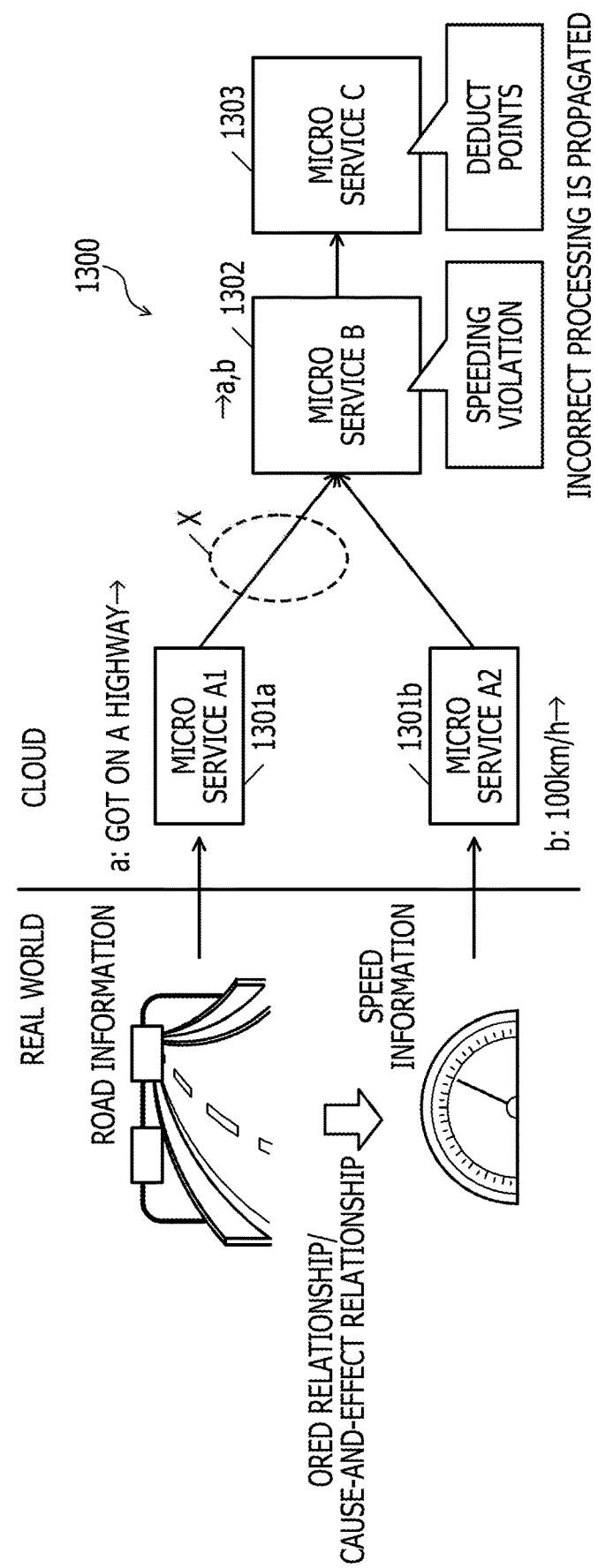
FIG. 13 is an explanatory diagram illustrating an event that demands order assurance in an n:1 message communication.

FIG. 13 is an explanatory diagram illustrating an event that demands order assurance in an n:1 message communication. In recent years, by the Internet of Things (IoT) technology, an event that has occurred in the real world is converted into a message (event) in the cloud, and the processing is becoming performed by message communications between microservices.

FIG. 13 illustrates an example of a speeding violation system of a vehicle that runs in the real world. In the real world, a sensor disposed in a vehicle, or the like detects a current location (ordinary road or highway) of the vehicle and a vehicle speed. In a system 1300 in the cloud, a microservice A1 (1301*a*) performs message processing on the current location of the vehicle, and a microservice A2 (1301*b*) performs message processing for detecting the speed of the vehicle. A microservice B (1302) jointly receives microservices A1 and A2 (1301*a* and 1301*b*), performs message processing for speeding violation, and a microservice C (1303) performs message processing for deducting points from a corresponding driving license.

In the microservice system 1300, it is assumed that the current location and the speed of a vehicle in the real world are the messages a and b respectively in this correct order. It is assumed that the message a has the current location of a highway, and the message b has a speed of 100 km/h.

However, if a delay X of the message a occurs, the microservice B (1302) performs message processing in an incorrect arrival order: b and a. In this case, although the vehicle runs at a speed of 100 km/h on a highway in the real world, the microservice B (1302) mistakenly perform message processing that the vehicle runs at a speed of 100 km/h at the current location (ordinary road) that is not on a highway and determines that the vehicle has committed speeding violation. Further, the downstream microservice C (1303) performs message processing for deducting a predetermined point based on the message processing for speeding violation.

In this manner, in the system 1300 in the cloud, if messages that are associated with events in the real world is not propagated in a correct order, an incorrect processing result is produced, and an error that has occurred in one microservice is further propagated to the downstream microservices.

Figure 14A:
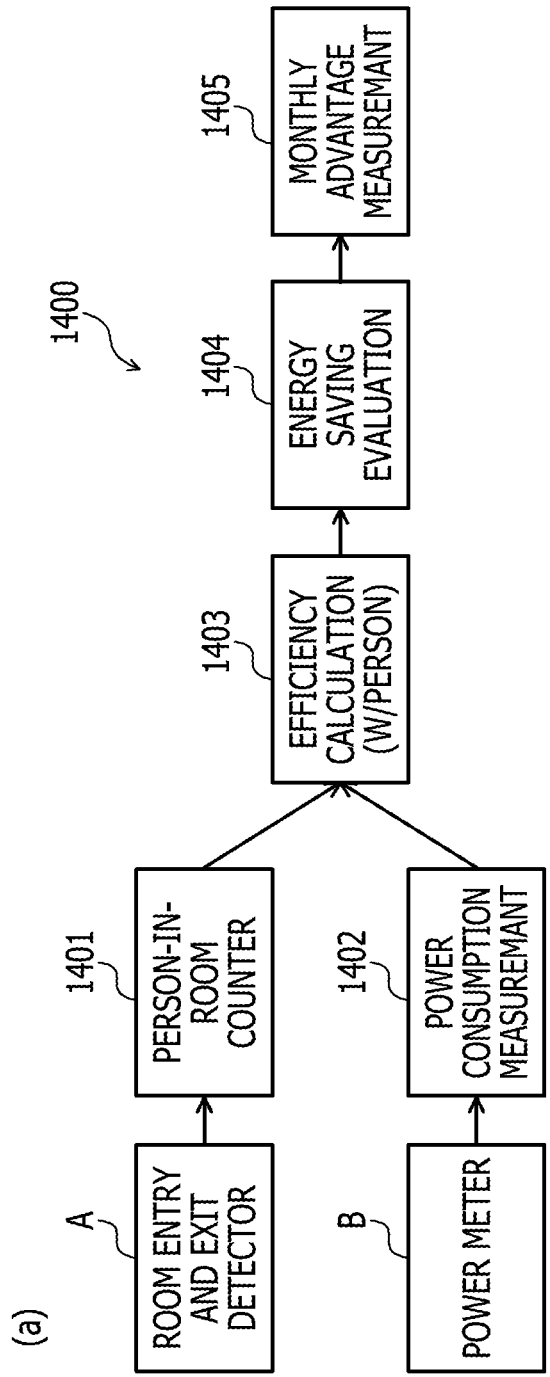
FIGS. 14A and 14B are explanatory diagrams illustrating a problem that occurs when a plurality of microservices work together according to the related art.
Figure 14B:
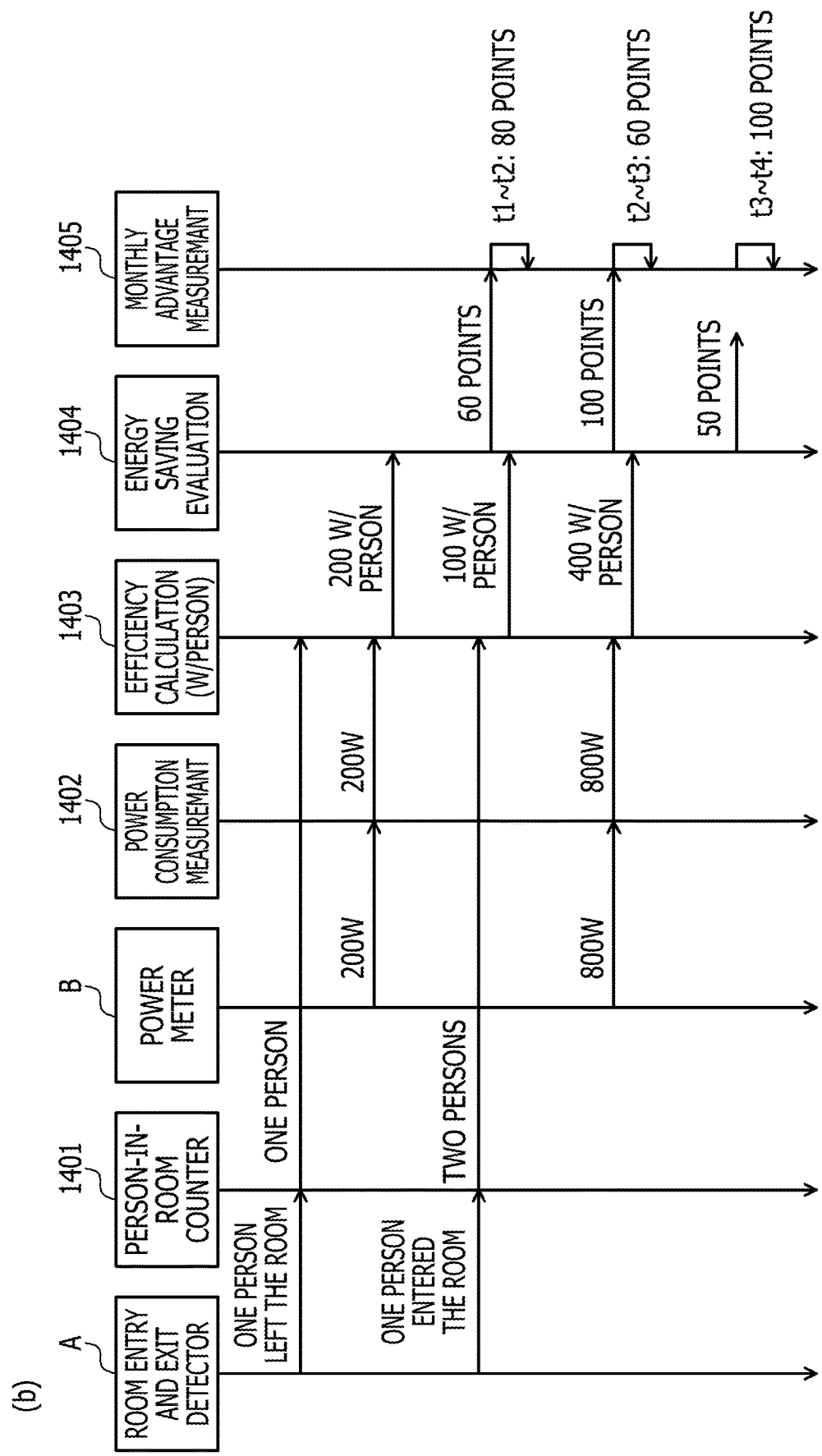
Figure 15A:
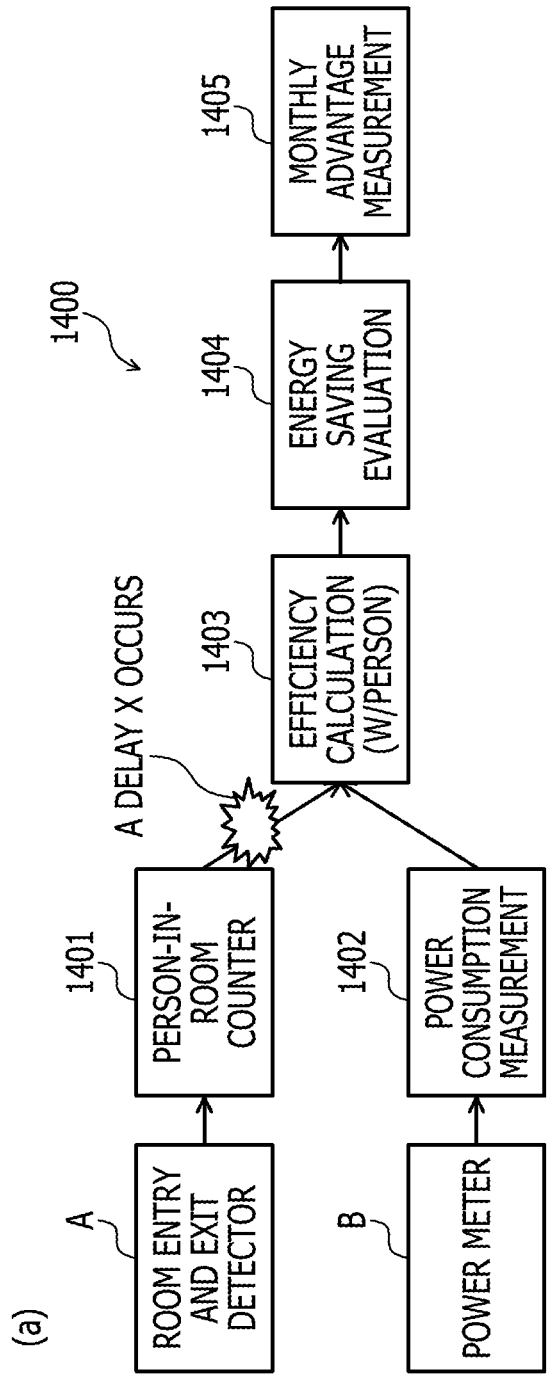

FIGS. 14A and 14B are explanatory diagrams illustrating a problem that occurs when a plurality of microservices work together according to the related art. FIGS. 15A and 15B are explanatory diagrams illustrating a problem that occurs when a plurality of microservices work together according to the related art. FIGS. 14A and 14B illustrate a system in which the energy saving efficiency of a certain room is measured in combination with five microservices. FIGS. 15A and 15B illustrate a system in which the energy saving efficiency of a certain room is measured in combination with five microservices. FIGS. 14A and 14B illustrate the case in which the message order is correct between the microservices. FIGS. 15A and 15B illustrate the case in which the message order is changed.

FIG. 14A is an example of the configuration of a system 1400. A room entry and exit detector A, illustrated in FIG. 14A, disposed in the real world detects the number of persons that entered the room by an entry and exit card, or the like for each user (individual), and a power meter B detects the power consumed in the room. Five microservices in the system 1400 are as follows. A person-in-room counter (microservice) 1401 counts (adds or subtracts) entry and exit of a person into and from the room based on the detection information of the room entry and exit detector A and performs message processing for determining the number of persons that are currently in the room. A power consumption measurement (microservice) 1402 performs message processing for measuring the power consumption of the room based on the measurement information by the power meter B.

An efficiency calculation (microservice) 1403 receives a message produced by joining the microservices of the person-in-room counter 1401 and the power consumption measurement 1402 and performs message processing for obtaining the power consumption efficiency per person currently in the room (W/person). An energy saving evaluation (microservice) 1404 performs message processing for evaluating the energy saving state by score based on the efficiency calculation result. A monthly advantage measurement (microservice) 1405 performs message processing for evaluating the monthly energy saving efficiency evaluation of the room (for example, score transition, monthly average evaluation score, the difference from the previous evaluation score, or the like).

FIG. 14B illustrates a sequence chart illustrating an example of operation of each microservice of the system 1400 when the message arrival order is normal. First, it is assumed that the room entry and exit detector A detects one person leaving the room, and the person-in-room counter (microservice) 1401 has determined the number of persons in the room is one at this time. The power meter B measures a power consumption of 200 W, and the efficiency calculation (microservice) 1403 performs efficiency calculation of 200 W/person. The energy saving evaluation (microservice) 1404 evaluates the energy saving evaluation of the person in the room as 60 points. The monthly advantage measurement (microservice) 1405 obtains the score transition from the previous energy saving evaluation time t1 to this time energy saving evaluation time t2. For example, if the previous time score was 80 points, the microservice 1405 outputs the t1 to t2 as 80 points.

After this, when the room entry and exit detector A detects one person entering the room, and the person-in-room counter (microservice) 1401 determines that two persons are in the room at this time, the efficiency calculation (microservice) 1403 performs efficiency calculation as 100 W/person. The energy saving evaluation (microservice) 1404 calculates the energy saving evaluation of the persons in the room as 100 points. The monthly advantage measurement (microservice) 1405 outputs the information (message) that describes a period of t2 to t3 as 60 points.

Next, a description will be given of the case where the message arrival order among the microservices is changed as illustrated in FIGS. 15A and 15B. As illustrated in FIG. 15A, it is assumed that a delay X of a message from the person-in-room counter (microservice) 1401 in the system 1400 occurs.

As illustrated in FIG. 15B, it is assumed that if the delay X occurs at the time when one person entered the room, the message output from the person-in-room counter (microservice) 1401 is received by the efficiency calculation (microservice) 1403 at the original arrival time (time t0). It is also assumed that the message output from the person-in-room counter (microservice) 1401 actually reached (received by) the efficiency calculation (microservice) 1403 at time tx due to the delay X.

In this case, during a period T of the delay X, the efficiency calculation (microservice) 1403 performs the message processing in a state of not receiving the message stating that one person has entered. In this case, the efficiency calculation (microservice) 1403 performs efficiency calculation (800 W/person) based on the power consumption 800 W detected by the power meter B in a state (one person in total) in which only one person is in the room while there are originally two persons in the room. As a result, the downstream energy saving evaluation (microservice) 1404 evaluates as 10 points, and the monthly advantage measurement (microservice) 1405 determines a period of t2 to t4 as 60 points. A sign × in FIG. 15B denotes the result of the message processing that had to be performed originally, but was unprocessed. A sign Δ denotes the result of the incorrect message processing.

After the lapse of the period T of the delay X of the message, the power consumption measurement (microservice) in the system 1400 detects an arrival delay of the message for the first time at the time tx when the delayed message actually arrived. In this manner, by the related art, if a delay of a message occurs, it is not possible to determine the presence or absence of the delay of the message during the period T of the delay, and mistakenly performs message processing. Thereby, a problem has occurred in that all the downstream microservices perform incorrect message processing in the same manner.

In contrast, in accordance with the embodiment, it is possible to detect an arrival delay of a message by the propagation state of the messages among microservices to each microservice and the timestamp at the time of message processing. It is possible to detect a message delay of one microservice in a queue simply by comparing the timestamps and to correct the messages to have the right message order.

If a message delay impacts a plurality of microservices, for example, it is possible to handle the case when a processed message is output to the downstream without performing message processing on the delayed message. In this case, rollback control is performed by referring to a snapshot after message processing so that it becomes possible to correct the messages to have correct order and to perform message processing once again. Specifically, it is possible for the downstream microservices to return the state of the messages in advance of the arrival delayed message by referring to the snapshot of the state prior to the message processing, and to perform the message processing once again from the arrival delayed message in the correct message order.

In a system configuration in which messages of a plurality of upstream microservices are joined and received by one downstream microservice, the message processing by the service processing unit is stopped by a correction notification. In the case where the message processing by microservices is performed in parallel at the upstream, for example, even if an arrival delay of one message occurs, it is possible for the other own microservice to correct the message arrival order. In addition, it is possible for the downstream microservices to avoid the further propagation of the incorrect message processing result to the downstream by stopping the message processing. When the top message of the queue becomes a corrected message, it is possible to release the stop and to restart the message processing.

The service processing unit ought to save a predetermined number, which is obtained from the queue size, of snapshots at the time of processing. At this time, it is possible to determine the snapshot to be maintained to have the recording capacity based on the number of service processing units in the downstream information processing apparatuses and the queue sizes. The lower the downstream of a microservice, the smaller it is possible to make the recording capacity. Thereby, it becomes possible to reduce the recording capacity for maintaining the snapshots of the entire system.

To date, the recording capacity of the snapshots to be maintained has been calculated by the number of generations that is empirically considered sufficient by the intuition of the operator, and thus has become the number of generations that is more than enough. Accordingly, excessive snapshots have been saved. In contrast, in the embodiment, it becomes possible to reduce the recording capacity of snapshots and to reduce the cost of the storage resources.

According to the embodiment, an upstream microservice detects an arrival delay and transmits a correction notification to the downstream microservices, and thus it is possible to correct the message order by a simple configuration. Accordingly, the message order assurance does not have to be performed on a transmission path, or the like, and thus an expensive dedicated system does not have to be used.

According to the embodiment, if a message arrival delay occurs in any one of a plurality of microservices that provide a predetermined service, it becomes possible for all the microservices to perform message processing in the respective correct message arrival order by simple processing at low cost.

It is possible to realize the information processing program described in the embodiments of the present disclosure by executing a program provided in advance on the processor of a server, or the like. The present control method is recorded in a computer-readable recording medium, such as a hard disk, a flexible disk, a Compact Disc-Read Only Memory (CD-ROM), a Digital Versatile Disk (DVD), a flash memory, or the like, and is read from the recording medium and executed by a computer. The present control method may be distributed via a network, such as the Internet, or the like.

All examples and conditional language provided herein are intended for the pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although one or more embodiments of the present invention have been described in detail, it should be understood that the various changes, substitutions, and alterations could be made hereto without departing from the spirit and scope of the invention.

What is claimed is:

1. A control apparatus comprising:
   one or more memories configured to store a reception history; and
   one or more processors coupled to the one or more memories, the one or more processors being configured to
   in response to reception of a first message which has a first timestamp indicating a time point at which the first message has been generated, obtain a group from among one or more messages stored in the reception history, each of the one or more messages stored in the reception history being a message which has been received prior to the received first message, the obtained group including a part of or whole of the one or more messages stored in the reception history, each message included in the obtained group having a second timestamp which indicates a time point at which the each message has been generated, the time point indicated by the second timestamp being a time point later than a time point indicated by a first timestamp associated with the received first message,
   in response to the obtaining of the group, generate a correction notification by using each message included in the obtained group, the correction notification including first information with respect to the first message and second information with respect to each message included in the obtained group, and
   in response to the generating of the correction notification, transmit the generated correction notification to an apparatus to which the first message is to be transmitted next, the transmitting of the generated correction notification being configured to cause the apparatus to correct order of processes in accordance with the first message indicated by the first information and the each message indicated by the second information.

2. The control apparatus according to claim 1, wherein the one or more processors are further configured to
   store a plurality of received messages in a queue in order of reception,
   read the plurality of messages in order of storage in the queue and execute a plurality of processes on the plurality of messages,
   hold a plurality of snapshots each of which includes a state for any of the plurality of processes, and
   in response to reception of a second correction notification, perform rollback on the basis of the plurality of snapshots.

3. The control apparatus according to claim 2, wherein the one or more processor are further configured to store one or a plurality of messages in the queue in corrected order based on the second correction notification in response to the reception of the second correction notification.

4. The control apparatus according to claim 2, wherein the one or more processors are further configured to delete a message in the queue to be corrected in response to reception of the second correction notification.

5. The microservice control apparatus according to claim 2, wherein
   the one or more processors are further configured to
   perform a stop of a process on a message in response to reception of a third correction notification, and
   when a top message in the queue is a message corresponding to corrected order based on the third correction notification, release the stop.

6. The control apparatus according to claim 2, wherein a storage capacity holding the plurality of snapshots is set in accordance with a number of downstream apparatus.

7. The control apparatus according to claim 1, wherein the second information included in the correction notification includes an identifier of each message included in the obtained group.

8. The control apparatus according to claim 1, wherein the transmitting of the generated correction notification is configured to cause the apparatus to cancel one or more processes each of which has been performed by the apparatus, each of the one or more processes being a process with respect to each message indicated by the second information in the correction notification.

9. The control apparatus according to claim 1, wherein the first message is a message for microservice, and each message included in the obtained group is a message for microservice.

10. A computer-implemented control method comprising:
in response to reception of a first message which has a first timestamp indicating a time point at which the first message has been generated, obtaining a group from among one or more of messages stored in reception history, each of the one or more messages stored in the reception history being a message which has been received prior to the received first message, the obtained group including a part of or whole of the one or more messages stored in the reception history, each message included in the obtained group having a second timestamp which indicates a time point at which the each message has been generated, the time point indicated by the second timestamp being a time point later than a time point indicated by a first timestamp associated with the received first message;
in response to the obtaining of the group, generating a correction notification by using each message included in the obtained group, the correction notification including first information with respect to the first message and second information with respect to each message included in the obtained group; and
in response to the generating of the correction notification, transmitting the generated correction notification to an apparatus to which the first message is to be transmitted next, the transmitting of the generated correction notification being configured to cause the apparatus to correct order of processes in accordance with the first message indicated by the first information and the each message indicated by the second information.

11. The control method according to claim 10, further comprising:
storing a plurality of received messages in a queue in order of reception;
reading the plurality of messages in order of storage in the queue and execute a plurality of processes on the plurality of messages;
holding a plurality of snapshots each of which includes a state for any of the plurality of processes; and
in response to reception of a second correction notification, performing rollback on the basis of the plurality of snapshots.

12. The control method according to claim 11, further comprising: storing one or a plurality of messages in the queue in corrected order based on the second correction notification in response to the reception of the second correction notification.

13. The control method according to claim 11, further comprising: deleting a message in the queue to be corrected in response to reception of the second correction notification.

14. The control method according to claim 11, further comprising:

performing a stop of a process on a message in response to reception of a third correction notification; and
when a top message in the queue is a message corresponding to corrected order based on the third correction notification, releasing the stop.

15. The control method according to claim 11, wherein a storage capacity holding the plurality of snapshots is set in accordance with a number of downstream apparatus.

16. The control method according to claim 10, wherein the second information included in the correction notification includes an identifier of each message included in the obtained group.

17. The control method according to claim 10, wherein the transmitting of the generated correction notification is configured to cause the apparatus to cancel one or more processes each of which has been performed by the apparatus, each of the one or more processes being a process with respect to each message indicated by the second information in the correction notification.

18. The control method according to claim 10, wherein the first message is a message for microservice, and each message included in the obtained group is a message for microservice.

19. A non-transitory computer-readable medium storing instructions executable by one or more computer, the instructions comprising:
one or more instructions configured to, in response to reception of a first message which has a first timestamp indicating a time point at which the first message has been generated, obtain a group from among one or more of messages stored in a reception history, each of the one or more messages stored in the reception history being a message which has been received prior to the received first message, the obtained group including a part of or whole of the one or more messages stored in the reception history, each message included in the obtained group having a second timestamp which indicates a time point at which the each message has been generated, the time point indicated by the second timestamp being a time point later than a time point indicated by a first timestamp associated with the received first message;
one or more instructions configured to, in response to the obtaining of the group, generating a correction notification by using each message included in the obtained group, the correction notification including first information with respect to the first message and second information with respect to each message included in the obtained group; and
one or more instructions configured to, in response to the generating of the correction notification, transmit the generated correction notification to an apparatus to which the first message is to be transmitted next, the transmitting of the generated correction notification being configured to cause the apparatus to correct order of processes in accordance with the first message indicated by the first information and the each message indicated by the second information.

* * * * *